(12) United States Patent
Boucké

(10) Patent No.: US 12,264,481 B2
(45) Date of Patent: Apr. 1, 2025

(54) MULTI-PURPOSE TILE SYSTEM

(71) Applicant: I4F Licensing NV, Hamont-Achel (BE)

(72) Inventor: Eddy Alberic Boucké, Menen (BE)

(73) Assignee: i4F Licensing NV, Turnhout (BE)

( * ) Notice: Subject to any disclaimer, the term of this patent is extended or adjusted under 35 U.S.C. 154(b) by 939 days.

(21) Appl. No.: 17/288,039

(22) PCT Filed: Sep. 30, 2019

(86) PCT No.: PCT/EP2019/076443
§ 371 (c)(1),
(2) Date: Apr. 23, 2021

(87) PCT Pub. No.: WO2020/083616
PCT Pub. Date: Apr. 30, 2020

(65) Prior Publication Data
US 2021/0381253 A1 Dec. 9, 2021

(30) Foreign Application Priority Data
Oct. 26, 2018 (NL) ........................... 2021887

(51) Int. Cl.
*E04F 15/02* (2006.01)
*E04F 15/10* (2006.01)
(Continued)

(52) U.S. Cl.
CPC ...... *E04F 15/02038* (2013.01); *E04F 15/102* (2013.01); *E04F 15/105* (2013.01);
(Continued)

(58) Field of Classification Search
CPC . E04F 15/02038; E04F 15/102; E04F 15/105; E04F 15/107; E04F 2201/0146; E04F 2203/02; B32B 3/06; B32B 5/022; B32B 5/024; B32B 7/12; B32B 9/02; B32B 9/045; B32B 27/08; B32B 27/12; B32B 27/20; B32B 27/22; B32B 27/281;
(Continued)

(56) References Cited
U.S. PATENT DOCUMENTS 8,745,952 B2 * 6/2014 Perra ................ E04F 15/02038
52/530
9,739,067 B2 8/2017 Zhang
(Continued)

FOREIGN PATENT DOCUMENTS

CN 202672612 U 1/2013
CN 103950267 A 7/2014
(Continued)

*Primary Examiner* — Adriana Figueroa
(74) *Attorney, Agent, or Firm* — The Webb Law Firm

(57) ABSTRACT

The invention relates to a multi-purpose tile system configured to being joined in a chevron pattern, wherein each tile includes a first pair of opposing edges consisting of a first edge and an opposite second edge and a second pair of opposing edges consisting of a third edge and an opposing fourth edge, wherein the first pair of opposing edges have pairs of opposing first mechanical coupling means for locking together said tiles at least vertically, and the second pair of opposing edges have pairs of opposing second mechanical coupling means for locking together said tiles at least vertically.

43 Claims, 9 Drawing Sheets

(51) Int. Cl.
    *B32B 3/06*     (2006.01)
    *B32B 5/02*     (2006.01)
    *B32B 7/12*     (2006.01)
    *B32B 9/02*     (2006.01)
    *B32B 9/04*     (2006.01)
    *B32B 27/08*     (2006.01)
    *B32B 27/12*     (2006.01)
    *B32B 27/20*     (2006.01)
    *B32B 27/22*     (2006.01)
    *B32B 27/28*     (2006.01)
    *B32B 27/30*     (2006.01)
    *B32B 27/32*     (2006.01)
    *B32B 27/34*     (2006.01)
    *B32B 27/36*     (2006.01)
    *B32B 27/38*     (2006.01)
    *B32B 27/40*     (2006.01)
    *B32B 27/42*     (2006.01)

(52) U.S. Cl.
    CPC .............. *E04F 15/107* (2013.01); *B32B 3/06* (2013.01); *B32B 5/022* (2013.01); *B32B 5/024* (2013.01); *B32B 7/12* (2013.01); *B32B 9/02* (2013.01); *B32B 9/045* (2013.01); *B32B 27/08* (2013.01); *B32B 27/12* (2013.01); *B32B 27/20* (2013.01); *B32B 27/22* (2013.01); *B32B 27/281* (2013.01); *B32B 27/304* (2013.01); *B32B 27/306* (2013.01); *B32B 27/32* (2013.01); *B32B 27/34* (2013.01); *B32B 27/36* (2013.01); *B32B 27/38* (2013.01); *B32B 27/40* (2013.01); *B32B 27/42* (2013.01); *B32B 2250/05* (2013.01); *B32B 2262/08* (2013.01); *B32B 2262/105* (2013.01); *B32B 2262/106* (2013.01); *B32B 2307/412* (2013.01); *B32B 2307/554* (2013.01); *B32B 2307/72* (2013.01); *B32B 2307/732* (2013.01); *B32B 2419/04* (2013.01); *E04F 2201/0146* (2013.01); *E04F 2203/02* (2013.01)

(58) Field of Classification Search
    CPC ..... B32B 27/304; B32B 27/306; B32B 27/32; B32B 27/34; B32B 27/36; B32B 27/38; B32B 27/40; B32B 27/42; B32B 27/18; B32B 27/30; B32B 2250/05; B32B 2262/08; B32B 2262/105; B32B 2262/106; B32B 2307/412; B32B 2307/554; B32B 2307/72; B32B 2307/732; B32B 2419/04
    See application file for complete search history.

(56) References Cited

U.S. PATENT DOCUMENTS

| | | | |
|---|---|---|---|
| 9,874,028 B2 | | 1/2018 | Boucké et al. |
| 9,938,727 B2 | * | 4/2018 | Ceysson ............ E04F 15/02038 |
| 10,156,045 B2 | * | 12/2018 | Penland ................ E04F 15/107 |
| 10,648,182 B2 | * | 5/2020 | De Rick ............... E04F 15/107 |
| 2006/0032168 A1 | * | 2/2006 | Thiers ..................... E04F 15/02 52/592.1 |
| 2017/0328072 A1 | * | 11/2017 | Hannig ............ E04F 15/02038 |
| 2018/0029407 A1 | * | 2/2018 | Yu .......................... E04F 15/048 |

FOREIGN PATENT DOCUMENTS

| | | |
|---|---|---|
| DE | 202005004537 U1 | 6/2005 |
| DE | 102010018452 A1 | 10/2011 |
| TW | 201537005 A | 10/2015 |
| WO | 2012136021 A1 | 10/2012 |
| WO | 2014043756 A1 | 3/2014 |
| WO | 2015130169 A1 | 9/2015 |
| WO | 2016091819 A1 | 6/2016 |
| WO | 2017013501 A1 | 1/2017 |
| WO | 2017016206 A1 | 2/2017 |
| WO | 2017115202 A1 | 7/2017 |
| WO | 2017122143 A1 | 7/2017 |
| WO | 2018087638 A1 | 5/2018 |

* cited by examiner

MULTI-PURPOSE TILE SYSTEM

CROSS-REFERENCE TO RELATED APPLICATIONS

This application is the United States national phase of International Application No. PCT/EP2019/076443 filed Sep. 30, 2019, and claims priority to The Netherlands Patent Application No. 2021887 filed Oct. 26, 2018, the disclosures of which are hereby incorporated by reference in their entirety.

BACKGROUND OF THE INVENTION

Field of the Invention

The invention relates to a multi-purpose tile system, in particular a floor tile system, comprising a plurality of multi-purpose tiles, in particular floor tiles. The invention also relates to a tile covering, in particular floor covering consisting of mutually coupled tiles according to the invention. The invention further relates to a tile for use in multi-purpose tile system according to the invention.

Description of Related Art

Chevron pattern had appeared in art as design around 4.000 years ago, on the recovered pottery found in Crete, ancient Greece. Chevron has become one of the main pattern designs for art, architecture and flooring later on. Chevron is derived from the French word chèvre ('goat'), translated from the Latin word 'capra' and referring to the famous V-shaped constellation Capricornus ('horned goat') of the zodiac. Obviously, this V-shaped has been the inspiration source of the V-shaped chevron pattern flooring it is still known today. The chevron patterns are typically used in the field of parquet wood flooring, wherein parquet panels are glued or nailed to a subfloor. The chevron floor tiles have the shape of a parallelogram, which is cut from an ordinary rectangular parquet plank, wherein usually both end surfaces of the panel are cut to enclose an angle of 45 degree with a longitudinal axis of the tiles. After installation, the chevron pattern is characterized by a straight separation line dividing the created V-shaped (herringbone) layout in two identical layout parts leading to an elegant, spacious, and even prestigious appearance. A drawback of the known chevron floor tiles is that these tiles are quite vulnerable at their pointed vertex (connecting two edges together). There is a need, however, to develop a interconnectable chevron floor panel, which can be installed relatively easily.

WO2012/136021 for instance describes a PVC lock floor board that comprises a main body, groove and corresponding elastic double-tongues. A walking surface of an upper surface of the PVC lock floor board is in a quadrangle shape. Each groove of the PVC lock floor board is interlocked with the corresponding elastic double-tongue of an adjacent PVC lock floor board from a lower direction when assembled, and each elastic double-tongue of the PVC lock floor board is interlocked with the corresponding groove of an adjacent PVC lock floor board from an upper direction when assembled.

SUMMARY OF THE INVENTION

It is a first object to provide a multi-purpose floor system comprising a plurality of interconnectable tiles for realizing a chevron pattern.

It is a second object to provide a multi-purpose floor system comprising a plurality of relatively invulnerable interconnectable tiles for realizing a chevron pattern.

The invention provides thereto a multi-purpose tile system, in particular a floor tile system, comprising a plurality of multi-purpose tiles, in particular floor tiles, wherein said tiles are configured to being joined in a chevron pattern, wherein each tile comprises a first pair of opposing edges consisting of a first edge and an opposite second edge, a second pair of opposing edges consisting of a third edge and an opposing fourth edge, wherein the first edge and the third edge enclose a first acute angle, and wherein the second edge and the fourth edge enclose a second acute angle opposing said first acute angle, and wherein the second edge and the third edge enclose a first obtuse angle, and wherein the first edge and the fourth edge enclose a second obtuse angle opposing said first obtuse angle, and wherein the first pair of opposing edges have pairs of opposing first mechanical coupling means for locking together said tiles at least vertically, and preferably also horizontally, comprising a first coupling profile, comprising an upward tongue, and a second coupling profile, comprising a downward tongue, wherein the second coupling profile of the tile to be coupled is adapted for co-action with the first coupling profile of another tile for mutual locking of the first coupling profile and the second coupling profile, wherein the second coupling profile allows locking together said tiles during substantially vertically downward movement of a tile towards the first coupling profile of a further tile, leading to locking of the first coupling profile and the second coupling profile, and the second pair of opposing edges have pairs of opposing second mechanical coupling means for locking together said tiles at least vertically, and preferably also horizontally, comprising a third coupling profile, comprising an upward tongue, and a fourth coupling profile, comprising a downward tongue, wherein the fourth coupling profile of the tile to be coupled is adapted for co-action with the third coupling profile of another tile for mutual locking of the third coupling profile and the fourth coupling profile, wherein the fourth coupling profile allows locking together said tiles during substantially vertically downward movement of the tile towards the third coupling profile of a yet another tile, leading to locking of the third coupling profile and the fourth coupling profile, wherein each tile comprises a substantially rigid base layer at least partially made of a composite material comprising at least one plastic material.

The tile system according to the invention comprises tiles having the shape of a parallelogram, and preferably a rhombus or a rhomboid, which in a joined state will form a chevron pattern. Installation of the tile system by interconnecting said tiles in order to create a tile covering can be realized by substantially vertically downward movement, or drop down movement of a first tile towards an already installed second tile, where a downward tongue of the first mechanical coupling means of the first tile will co-act with an upward tongue of the first mechanical coupling means of a second tile such that mutual locking of said tiles is obtained. During this vertically downward movement of the first tile towards the second tile, the downward tongue of the second mechanical coupling means of the first tile can be connected (simultaneously) with an upward tongue of the second mechanical coupling means of an another already installed third tile. Coupling of the tiles can therefore basically be done via vertical folding of the tiles. It is possible that the first coupling profile of the first mechanical coupling means is substantially identical to the third coupling profile of the second mechanical coupling means. It is however also possible that the upward tongue of the first coupling profile and the upward tongue of the third coupling profile are different. They can be for example different in design and/or different in their technical functionality. Likewise is it possible that the second coupling profile of the first mechanical coupling means is substantially identical to the fourth coupling profile of the second mechanical coupling means. However, also the downward tongues of the second coupling profile and the fourth coupling profile may be different. Due to the parallelogrammatic shape of the tiles, a chevron pattern can be realized in this manner in a relatively simple and efficient manner compared to the installation of conventional parquet wood tiles. The multi-purpose tiles of the tile system according to the invention are relatively inexpensive to manufacture and do not require special skills or training to handle and install, making it attractive for do-it-yourself individuals who have had no previous experience installing tiles. The substantially rigid base layer of each tile is at least partially made of a composite material comprising at least one plastic material. It is advantageous that the base layer provides sufficient rigidity and impact strength to the tile as this may prevent damaging, and in particular breakage, of the coupling profiles. The composite material comprising at least one plastic material can for example comprise up to 10% of plasticizer, resulting in the base layer of the tile being substantially rigid. Hence, also the tile as such is generally substantially rigid. It is also possible that the base layer of at least one tile is substantially free of plasticizer. The tile system according to the invention can be used for different purposes, non-limiting examples thereof are to realize a ceiling covering, a wall covering, and/or a floor covering, or, for example, as covering of a piece of furniture. Because the coupling profiles are given a specific form, the substantially complementarily formed first and second coupling profiles and the substantially complementarily formed third and fourth coupling profiles of adjacent tiles can be coupled to each other relatively simply, but durably and efficiently. During coupling of adjacent tiles a force will here be exerted on one or both complementary third and fourth and/or first and second coupling profiles, whereby the one or both coupling profiles may slightly and temporarily (resiliently) deform to some extent, such that the co-action of the upward tongue and the downward tongue can be simplified. By subsequently allowing the forced coupling profiles to move back (resiliently) to the original position a reliable, locked coupling will be realized between upward and downward tongue. Due to the rigidity of the base layer, and due to the fact that the at least a part of the coupling profiles will typically be integrated with said base layer (at least in some embodiments), the resiliency of the coupling parts will be commonly be very restricted though sufficient to allow tiles to be coupled and uncoupled. This locked coupling, wherein both coupling profiles mutually engage in relatively reliable manner, and which commonly results in a locking effect between two tiles at least vertical direction, and preferably horizontally, will preferably be without play, which counteracts the risk of the occurrence of creaking noises. Hereby, it is aspired to reduce this risk by a suitable design of the profiles of the coupling profiles, such that the risk of said undesired noises is reduced even if no sliding agent is applied, which, however, does not exclude that a sliding agent still can be applied on the coupling profiles of the tiles according to the invention.

The tiles of the tile system according to the invention may also be referred to as panels. The base layer may also be referred to as core layer. The coupling profiles may also be referred to as coupling parts or as connecting profiles. By "complementary" coupling profiles is meant that these coupling profiles can cooperate with each other. However, to this end, the complementary coupling profiles do not necessarily have to have perfectly complementary forms. By locking in "vertical direction" is meant locking in a direction perpendicular to the plane of the tile. By locking in "horizontal direction" is meant locking in a direction perpendicular to the respective coupled edges of two tiles and parallel to or falling together with the plane defined by the tiles. In case in this document reference is made to a "floor tile" or "floor panel", these expressions may be replaced by expressions like "tile", "wall tile", "ceiling tile", "covering tile".

When realizing a chevron pattern, it is advantageous in case the system comprises two different types of tiles (A and B respectively), and wherein the first mechanical coupling means of one type of tile along the first pair of opposite edges are arranged in a mirror-inverted manner relative to the corresponding first mechanical coupling means along the same first pair of opposite edge portions of the other type of tile. An advantage of identical and mirror-inverted tiles to be used in a system according to the invention is that the tiles can be produced easily, wherein, for example, the second mechanical coupling means of both the A and B type tiles can be machined, for instance, in a first machine. Then the A type tiles proceed to another machine where the first mechanical coupling means is machined. The boards that are to be provided with mirror-inverted first mechanical coupling means, for instance the B type tiles, are however rotated through 180 in the same plane before machining of the first mechanical coupling means. Thus the two types of board A and B can be manufactured using the same machines and the same set of tools. Distinctive visual markings, for example coloured labels, symbolic labels, (pre-attached) differently coloured backing layers, and/or text labels, may be applied to different tile types to allow a user to easily recognize the different tiles types during installation. Preferably the visual markings are not visible in a coupled condition of the tiles (from a top view). A visual marking may, for example, be applied onto the upper side of the upward tongue and/or inside the upward groove and/or inside the downward groove. It is imaginable that the system according to the invention comprises more than two different types of tiles.

In a preferred configuration, at least one tile has a configuration wherein: the first coupling profile is arranged at the first edge; the second coupling profile is arranged at the second edge; the third coupling profile is arranged at the third edge; and the fourth coupling profile is arranged at the fourth edge. This tile could, for example, be referred to as an A type tile. In another preferred configuration, at least one tile has a configuration wherein: the first coupling profile is arranged at the second edge; the second coupling profile is arranged at the first edge; the third coupling profile is arranged at the third edge; and the fourth coupling profile is arranged at the fourth edge. This tile could, for example, be referred to as a B type tile.

In a preferred embodiment of the tile system according to the invention the first coupling profile and/or the third coupling profile comprises at least one upward flank lying at a distance from the upward tongue and an upward groove formed between the upward tongue and the upward flank, wherein at least a part of a side of the upward tongue facing the upward flank is inclined upwardly towards the upward flank, and wherein at least a part of a side of the upward tongue facing away from the upward flank optionally comprises at least one first locking element, which preferably makes integral part of the upward tongue, and wherein the second coupling profile and/or fourth coupling profile comprises at least one downward flank lying at a distance from the downward tongue, and a downward groove formed between the downward tongue and the downward flank, wherein at least a part of a side of the downward tongue facing the downward flank is inclined downwardly towards the downward flank, and wherein the downward flank optionally comprises at least one second locking element, which preferably makes integral part of the downward flank, and adapted for co-action with the at least one first locking element of yet a further tile. The first locking element, if applied, is preferably positioned at a distance from an upper side of the upward tongue. The second locking element, if applied, is preferably positioned at a distance from an upper side of the downward groove. In case the first and second locking elements are omitted, there might be an optional space in between tiles, in coupled condition, in particular in between on the one hand the distal side of the upward tongue, facing away from the upward flank, and on the other hand the downward flank.

An embodiment is possible wherein the third coupling profile comprises at least one upward flank lying at a distance from the upward tongue and an upward groove formed between the upward tongue and the upward flank, wherein, preferably, at least a part of a side of the upward tongue facing the upward flank is inclined toward the upward flank, and wherein at least a part of a side of the upward tongue facing away from the upward flank comprises at least one third locking element, which preferably makes integral part of the upward tongue, and wherein the fourth coupling profile comprises at least one downward flank lying at a distance from the downward tongue, and a downward groove formed between the downward tongue and the downward flank, wherein, preferably, at least a part of a side of the downward tongue facing the downward flank is inclined toward the downward flank, and wherein the downward flank comprises at least one fourth locking element, which preferably makes integral part of the downward flank, and adapted for co-action with the at least one third locking element of yet a further tile. The inclination may lead to "open grooves": at least a part of a side of the upward tongue facing the upward flank is inclined upwardly away from the upward flank, and at least a part of a side of the downward tongue facing the downward flank is inclined downwardly away from the downward flank. The third locking element, if applied, is preferably positioned at a distance from an upper side of the upward tongue. The fourth locking element, if applied, is preferably positioned at a distance from an upper side of the downward groove.

In a preferred embodiment are the coupling profiles designed such that locking of the second coupling profile of a tile with a first coupling profile of another tile can take place substantially simultaneously with the locking of the fourth coupling profile of the tile with the third coupling profile of yet another tile. This may significantly reduce the time required to install the tile system according to the invention, since the coupling of two edges of a tile to be installed can be done in a single action. This also is beneficial for the ease of use, making the tile system suitable for both professional and consumer use.

Typically, the length of the first edge and the length of the second edge of a tile are substantially identical. It is also typical that the length of the third edge and the length of the fourth edge of a tile are substantially identical. It is imaginable that the length of the first edge and the length of the second edge of a tile are substantially identical to the length of the third edge and the fourth edge of said tile. This configuration will lead to a rhombically shaped tile (diamond shaped tile). This configuration allows that only a single tile (type) can be used in the tile system according to the invention. Here, typically the first coupling profile (located at the first edge of a first tile) will be coupled to the fourth coupling profile (located at the fourth edge of second tile) to form a (line forming) mitre joint of the chevron pattern, and the fourth coupling profile of the first tile will be connected to a third coupling profile (located at the third edge of a third tile) to form a lateral joint. However, it is commonly more preferred that the length of the first edge and the length of the second edge of a tile are greater than the length of the third edge and the fourth edge of said tile. This configuration will lead to an oblong tile with a parallelogrammatic shape. With these oblong tiles it is possible to realize a chevron pattern in two ways. Here, the first option is to apply only a single tile (type) in the tile system according to the invention, by means of which an asymmetric chevron pattern can be created. More in particular, typically the first coupling profile (located at the short first edge of a first tile) will be coupled to the fourth coupling profile (located at the long fourth edge of second tile) to form a (line forming) mitre joint of the chevron pattern, and the fourth coupling profile of the first tile will be connected to a third coupling profile (located at the long third edge of a third tile) to form a lateral joint. In this configuration typically a plurality of tiles is connected with their first coupling profiles to a single fourth coupling profile of an adjacent tile, which provides the indicated asymmetry. Since a symmetric chevron pattern is commonly more preferred, it is commonly more preferred, to apply two different types of oblong tiles (type A tiles and type B tiles). The type A tile and the type B tile commonly have identical dimensions, but have a mirror-inverted configuration of coupling profiles. Here, typically the first coupling profile (located at the first edge of a first tile) will be coupled to the second coupling profile (located at the second edge of second tile) to form a (line forming) mitre joint of the chevron pattern, whereas the fourth coupling profile of the first tile will be connected to a third coupling profile (located at the third edge of a third tile) to form a lateral joint. More details relating to this embodiment are provided below.

The first acute angle and the second acute angle of each tile of the tile system according to the invention, are preferably situated between 30 and 60 degrees, more preferably between 40 and 50 degrees, and are in particular preferably equal to approximately 45 degrees (+/−1 or 2 degrees). The first obtuse angle and the second obtuse angle of each tile of the tile system according to the invention are preferably situated between 120 and 150 degrees, more preferably between 130 and 140 degrees, are in particular preferably equal to approximately 135 degrees (+/−1 or 2 degrees).

It is possible that the substantially rigid base layer of at least one tile comprises between 0 and 10% of plasticizer. This results in the base layer of the tile being substantially rigid. The plastic material used as plastic material in the base layer is preferably free of any plasticizer in order to increase the desired rigidity of the base layer, which is, moreover, also favourable from an environmental point of view.

However, in a further possible embodiment however, depending on amongst others, the dimensions of the tile, it is also possible that the composite material comprises at least one plastic and more than 10% plasticizer. This is for example possible for relatively large tiles.

Each tile preferably comprises an upper substrate affixed to an upper side the base layer, wherein said substrate preferably comprises a decorative layer. The upper substrate is preferably at least partially made of at least one material selected from the group consisting of: metals, alloys, macromolecular materials such as vinyl monomer copolymers and/or homopolymers; condensation polymers such as polyesters, polyamides, polyimides, epoxy resins, phenol-formaldehyde resins, urea formaldehyde resins; natural macromolecular materials or modified derivatives thereof such as plant fibres, animal fibres, mineral fibres, ceramic fibres and carbon fibres. Here, the vinyl monomer copolymers and/or homo-polymers are preferably selected from the group consisting of polyethylene, polyvinyl chloride (PVC), polystyrene, polymethacrylates, polyacrylates, polyacrylamides, ABS, (acrylonitrile-butadiene-styrene) copolymers, polypropylene, ethylene-propylene copolymers, polyvinylidene chloride, polytetrafluoroethylene, polyvinylidene fluoride, hexafluoropropene, and styrene-maleic anhydride copolymers, and derivates thereof. The upper substrate most preferably comprises polyethylene or polyvinyl chloride (PVC). The polyethylene can be low density polyethylene, medium density polyethylene, high density polyethylene or ultrahigh density polyethylene. The upper substrate layer can also include filler materials and other additives that improve the physical properties and/or chemical properties and/or the processability of the product. These additives include known toughening agents, plasticizing agents, reinforcing agents, anti-mildew (antiseptic) agents, flame-retardant agents, and the like. The upper substrate typically comprises a decorative layer and an abrasion resistant wear layer covering said decorative layer, wherein a top surface of said wear layer is the top surface of said tile, and wherein the wear layer is a transparent material, such that decorative layer is visible through the transparent wear layer and, optionally, a transparent finishing layer situated in between the decorative layer and the wear layer.

The thickness of the upper substrate typically varies from about 0.1 to 3.5 mm, preferably from about 0.5 to 3.2 mm, more preferably from about 1 to 3 mm, and most preferably from about 2 to 2.5 mm. The thickness ratio of the base layer to the upper substrate commonly varies from about 1 to 15:0.1 to 3.5, preferably from about 1.5 to 10:0.5 to 3.2, more preferably from about 1.5 to 8:1 to 3, and most preferably from about 2 to 8:2 to 2.5, respectively.

Each tile may comprise an adhesive layer to affix the upper substrate, directly or indirectly, onto the base layer. The adhesive layer can be any well-known bonding agent or binder capable of bonding together the upper substrate and the base layer, for example polyurethanes, epoxy resins, polyacrylates, ethylene-vinyl acetate copolymers, ethylene-acrylic acid copolymers, and the like. Preferably, the adhesive layer is a hot-melt bonding agent.

The decorative layer or design layer, which may be part of the upper substrate as mentioned above, can comprise any suitable known plastic material such as a known formulation of PVC resin, stabilizer, plasticizer and other additives that are well known in the art. The design layer can be formed with or printed with printed patterns, such as wood grains, metal or stone design and fibrous patterns or three-dimensional figures. Thus the design layer can provide the tile with a three dimensional appearance that resembles heavier products such as granite, stone or metal. The thickness of the design layer typically varies from about 0.01 to 0.1 mm, preferably from about 0.015 to 0.08 mm, more preferably from about 0.2 to 0.7 mm, and most preferably from about 0.02 to 0.5 mm. The wear layer that typically forms the upper surface of the tile can comprise any suitable known abrasion-resistant material, such as an abrasion-resistant macromolecular material coated onto the layer beneath it, or a known ceramic bead coating. If the wear layer is furnished in layer form, it can be bonded to the layer beneath it. The wear layer can also comprise an organic polymer layer and/or inorganic material layer, such as an ultraviolet coating or a combination of another organic polymer layer and an ultraviolet coating. For example, an ultraviolet paint capable of improving the surface scratch resistance, glossiness, antimicrobial resistance and other properties of the product. Other organic polymers including polyvinyl chloride resins or other polymers such as vinyl resins, and a suitable amount of plasticizing agent and other processing additives can be included, as needed.

In a preferred embodiment, at least one tile comprises a plurality of strip shaped upper substrates directly or indirectly affixed to an upper side the base layer, wherein said upper substrate are arranged side by side in the same plane, preferably in a parallel configuration. Here, the plurality of upper substrates preferably substantially completely cover the upper surface of the base layer, and more preferably extend from the first edge to the second edge of the tile. Each of the plurality of upper substrates comprises a decorative layer, wherein the decorative layers of at least two adjacently arranged upper substrates preferably have different appearances. The application of a plurality of strip shaped upper substrates, are arranged side by side in the same plane and directly or indirectly affixed to the base layer will create the attractive aesthetical effect that the chevron tiles is defined by the strip shaped upper substrates as such, while having the advantages that during installation merely the tiles as such will have to be coupled rather than the strip shaped upper substrate, which would be time-consuming and expensive.

Preferably, each tile comprises at least one backing layer affixed to a bottom side of the base layer, wherein said at least one backing layer at least partially made of a flexible material, preferably an elastomer. The thickness of the backing layer typically varies from about 0.1 to 2.5 mm. Non-limiting examples of materials whereof the backing layer can be made of are polyethylene, cork, polyurethane and ethylene-vinyl acetate. The thickness of a polyethylene backing layer is for example typically 2 mm or smaller. The backing layer commonly provides additional robustness and impact resistances to each tile as such, which increases the durability of the tiles. Moreover, the (flexible) backing layer may increase the acoustic (sound-dampening) properties of the tiles. In a particular embodiment, the base layer is composed of a plurality of separate base layer segments affixed to said at least one backing layer, preferably such that said base layer segments are mutually hingeable. The lightweight features of the tiles are advantageous for obtaining a secure bond when installing the tile on vertical wall surfaces. It is also especially easy to install the tile at vertical corners, such as at inside corners of intersecting walls, pieces of furniture, and at outside corners, such as at entry ways. An inside or outside corner installation is accomplished by forming a groove in the base layer of the tile to facilitate bending or folding of the tile.

At least one reinforcing layer may be situated in between the base layer and the upper substrate. This may lead to further improvement of the rigidity of the tiles as such. This may also lead to improvement of the acoustic (sound-dampening) properties of the tiles. The reinforcement layer may comprise a woven or non-woven fibre material, for example a glass fibre material. They may have a thickness of 0.2-0.4 mm. It is also conceivable that each tile comprises a plurality of the (commonly thinner) base layer stacked on top of each other, wherein at least one reinforcing layer is situated in between two adjacent base layers. Preferably, the density of the reinforcing layer is preferably situated between 1.000 and 2.000 kg/m3, preferably between 1.400- and 1.900 kg/m3, and more preferably between 1.400-1.700 kg/m3.

Preferably, at least a part of the first coupling profile and/or at least a part of second coupling profile of each tile is integrally connected to the base layer, and/or wherein at least a part of the third coupling profile and/or at least a part of fourth coupling profile of each tile is integrally connected to the base layer. This may also be understood as that the at least part of the first mechanical coupling means and/or at least part of the second mechanical coupling means is/are integrally formed within and/or formed by the base layer.

As already addressed above, the first coupling profile and/or the second coupling profile may allow deformation during coupling and uncoupling. It is additionally also possible that the third coupling profile and/or the fourth coupling profile may allow deformation during coupling and uncoupling. This may enhance the ease of use during coupling and uncoupling of tiles in the tile system.

During coupling and uncoupling the coupling profiles will commonly be inclined to deform at or in their weakest section. To this end, at least one coupling profile of the first coupling profile and second coupling profile may comprise a bridge connecting the tongue of said coupling profile to the base layer, wherein the minimum thickness of the bridge is smaller than the minimum width of the tongue. It is also conceivable that at least one coupling profile of the third coupling profile and fourth coupling profile comprises a bridge connecting the tongue of said coupling profile to the base layer, wherein the minimum thickness of the bridge is smaller than the minimum width of the tongue. This will force the bridge(s) rather than the tongue itself to be slightly deformed during coupling and uncoupling, which is commonly in favour of the durability (and shape stability) of the tongues, and hence of the durability and reliability of the coupling realized between two tiles.

The second coupling profile comprises an upper bridge connecting the downward tongue to the base layer, wherein the upper bridge is configured to deform during coupling of adjacent tiles, to widen the downward groove, and wherein, preferably, a lower side of the upper bridge of the second coupling profile is at least partially inclined. The inclination of the bridge part of the second coupling profile creates a natural weakened area of the bridge part, where deformation is likely to occur. It is beneficial for this embodiment if the upper side of the tile is adapted to engage substantially seamless to the upper side of another tile. Preferably is the upper side of the upward tongue at least partially inclined, wherein the inclination of the upper side of the upward tongue and the inclination of the bridge part of the second coupling profile are substantially similar. If applied, the inclinations may for instance mutually enclose an angle between 0 and 5 degrees.

The fourth coupling profile comprises an upper bridge connecting the downward tongue to the base layer, wherein the upper bridge is configured to deform during coupling of adjacent tiles, to widen the downward groove, and wherein, preferably, a lower side of the upper bridge of the second coupling profile is at least partially inclined. The inclination of the bridge part of the second coupling part creates a natural weakened area of the bridge part, where deformation is likely to occur. And preferably is the upper side of the upward tongue at least partially inclined, wherein the inclination of the upper side of the upward tongue and the inclination of the bridge part of the second coupling profile art are substantially similar, wherein both inclinations for instance mutually enclose an angle between 0 and 5 degrees. It is in particular beneficial if the upper side of the tile is adapted to engage substantially seamless to the upper side of another tile.

Each of the upward tongue and the downward tongue is preferably substantially rigid, which means that the tongues are not configured to be subjected to deformation. The tongues as such are relatively stiff and hence non-flexible. Moreover, the tongues are preferably substantially solid, which means that the tongues are substantially massive and thus completely filled with material and are therefore not provided with grooves at an upper surface which would weaken the construction of the tongue and hence of the tile connection to be realised. By applying a rigid, solid tongue a relatively firm and durable tongue is obtained by means of which a reliable and the durable tile connection can be realised without using separate, additional components to realise a durable connection.

In a possible embodiment of the tile, at least a part of the upward flank adjoining the upper side of the tile, if applied, is adapted to make contact with at least a part of the downward tongue adjoining the upper side of another tile in a coupled state of these tiles. Engagement of these surfaces will lead to an increase of the effective contact surface between the coupling parts and hence to an increase of stability and sturdiness of the connection between two tiles. In a favourable embodiment the upper side of the tile is adapted to engage substantially seamless to the upper side of another tile, as a result of which a seamless connection between two tiles, and in particular the upper surfaces thereof, can be realised.

It is furthermore possible that the first locking element, if applied, comprises at least one outward bulge, and that the second locking element, if applied, comprises at least one recess, which outward bulge is adapted to be at least partially received in a recess of an adjacent coupled tile for the purpose of realizing a locked coupling.

It is hence also possible that the third locking element comprises at least one outward bulge, and that the fourth locking element comprises at least one recess, which outward bulge is adapted to be at least partially received in a recess of an adjacent coupled tile for the purpose of realizing a locked coupling. This embodiment variant is generally advantageous from a production engineering viewpoint. The first locking element and the second locking element preferably take a complementary form, whereby a form-fitting connection of the locking elements of adjacent tiles to each other will be realized, this enhancing the effectiveness of the locking. Alternatively, the second locking element comprises at least one outward bulge, and the first locking element comprises at least one recess, which outward bulge is adapted to be at least partially received in a recess of an adjacent coupled tile for the purpose of realizing a locked coupling. It is also conceivable that the first and second locking elements are not formed by a bulge-recess combination, but by another combination of co-acting profiled surfaces and/or high-friction contact surfaces. In this latter embodiment, the first locking element and/or the second locking element may be formed by a (flat of otherwise shaped) contact surface composed of a, optionally separate, plastic material configured to generate friction with the other locking element of another tile in engaged (coupled) condition. Examples of plastics suitable to generate friction include:

Acetal (POM), being rigid and strong with good creep resistance. It has a low coefficient of friction, remains stable at high temperatures, and offers good resistance to hot water;

Nylon (PA), which absorbs more moisture than most polymers, wherein the impact strength and general energy absorbing qualities actually improve as it absorbs moisture. Nylons also have a low coefficient of friction, good electrical properties, and good chemical resistance;

Polyphthalamide (PPA). This high performance nylon has through improved temperature resistance and lower moisture absorption. It also has good chemical resistance;

Polyetheretherketone (PEEK), being a high temperature thermoplastic with good chemical and flame resistance combined with high strength. PEEK is a favorite in the aerospace industry;

Polyphenylene sulfide (PPS), offering a balance of properties including chemical and high-temperature resistance, flame retardance, flowability, dimensional stability, and good electrical properties;

Polybutylene terephthalate (PBT), which is dimensionally stable and has high heat and chemical resistance with good electrical properties;

Thermoplastic polyimide (TPI) being inherently flame retardant with good physical, chemical, and wear-resistance properties.

Polycarbonate (PC), having good impact strength, high heat resistance, and good dimensional stability. PC also has good electrical properties and is stable in water and mineral or organic acids; and Polyetherimide (PEI), maintaining strength and rigidity at elevated temperatures. It also has good long-term heat resistance, dimensional stability, inherent flame retardance, and resistance to hydrocarbons, alcohols, and halogenated solvents.

The performance of many of the above polymers can also be enhanced using certain additives which reduce fiction (if desired). The high-friction polymer material may, for example, be applied as a (separate) material strip. Application of this high-friction polymer material allows the distant side (outer side) of the upward tongue and the downward flank to have a substantially flat design.

In yet another embodiment it is possible that a side of the downward tongue of the second coupling profile facing away from the downward flank is provided with a first secondary locking element, and that the upward flank is provided with a second secondary locking element, said first secondary locking element being adapted to cooperate with a second secondary locking element of another tile. This would result in an additional inner locking mechanism, which could further improve the stability and reliability of the coupling. Also in this embodiment, the first (or second) secondary locking element may be formed by one or more bulges, wherein the second (or first) secondary locking element may be formed by one of more complementary recesses adapted to co-act with said bulges in coupled condition of adjacent tiles. Preferably, the co-action between the first secondary locking element and the second secondary locking element, in coupled condition of two tiles, defines a tangent T1 which encloses an angle A1 with a plane defined by the tile, which angle A1 is smaller than an angle A2 enclosed by said plane defined by the tile and a tangent T2 defined by a co-action between an inclined part of a side of the upward tongue facing toward the upward flank and an inclined part of a side of the downward tongue facing toward the downward flank. More preferably, the greatest difference between angle A1 and angle A2 is situated between 5 and 10 degrees. It is conceivable that the shortest distance between an upper edge of the downward tongue and a lower side of the base layer defines a plane, wherein the first secondary locking element and at least a part of the downward tongue are situated at opposite sides of said plane. In this case, the first secondary locking element protrudes with respect to the tile edge defined by an upper section or upper surface of the tile. Here, the first secondary locking element may protrude into an adjacent tile in a coupled condition which may further improve the tile coupling. It is advantageous in case the minimum distance between said first secondary locking element and an upper side of the tile is smaller than the minimum distance between an upper side of the upward tongue and said upper side of the tile. This configuration is also possible for the fourth coupling profile having a third secondary locking element, wherein the third secondary locking element is adapted to cooperate with a fourth secondary locking element of another tile. Hence, when it is referred to downward tongue of the second coupling profile the describes embodiment can also be applied to the downward tongue of the fourth coupling profile. Additionally, when it is referred to upward tongue of the first coupling profile the described embodiment can also be applied to the upward tongue of the third coupling profile.

In a possible embodiment is the base layer of at least one tile at least partially made of polyvinyl chloride (PVC). An advantage of PVC is that the material has a good water- and moisture resistance and that the material has a relatively good processability. Despite the base layer being substantially rigid, the base layer being at least partially made of PVC may also enable the tile to comprise sufficient elasticity enhancing the ease of use of the tile, in particular during coupling of the coupling parts. PVC is furthermore chemically stable, corrosion resistant, and has excellent flame-retardant properties. It is for example possible that the base layer of at least one tile comprises a stone plastic composite (SPC) and/or wood plastic composite (WPC). Both material benefit of being waterproof, having a good impact resistance and flame-retardant properties. SPC typically comprises of around 60% calcium carbonate (limestone), polyvinyl chloride and plasticizers. WPC typically comprises polyvinyl chloride, calcium carbonate, plasticizers, a foaming agent, and wood-like or wood materials such as wood flour. The base layer may be formed of a single material (single core layer). However, the base layer may also comprises a plurality of layers. Different layers may have the same composition, although it is more preferred that at least two different layers have different compositions, in order to improve the overall properties of the base layer. At least one base layer may for example be made of a composite of at least one polymer and at least one non-polymeric material. PVC, SPC and/or WPC have the advantage that this are relatively strong material. Conventional materials, like HDF and MDF, are weaker than the aforementioned PVC, WPC and SPC which might negatively influence the strength of the tile, and in particular the durability of the tile, more in particular durability of the coupling profiles of the tile. For any of the plastic material it is possible that a filler, for example a mineral filler is used. Such filler material can be advantageous in plastics-based tiles in order to improve the rigidity of the tile. Particularly suitable materials here are for example talk or calcium carbonate (chalk), aluminum oxide, silica gel, quartz powder, wood powder, gypsum. For example, chalk may be provided in a range from ≥30 wt. % to ≤70 wt. %, wherein in particular, the slippage of the tile can be improved by means of the filler materials, in particular by means of the chalk. Said filler materials may also be pigmented in a known manner. In particular, it may be provided that the material of the tiles has a flame retardant. The density of the base layer typically varies from about 0.1 to 1.5 grams/cm3, preferably from about 0.2 to 1.4 grams/cm3, more preferably from about 0.3 to 1.3 grams/cm3, even more preferably from about 0.4 to 1.2 grams/cm3, even more preferably from about 0.5 to 1.2 grams/cm3, and most preferably from about 0.6 to 1.2 grams/cm3. The plastic material used in the base layer and/or the base layer as such preferably has an elastic modulus of more than 700 MPa (at a temperature of 23 degrees Celsius and a relative humidity of 50%). This will commonly sufficiently rigidity to the base layer, and hence to the parallelogrammatic/rhombic tile as such.

It is beneficial if at least a number of tiles is identical. This may enable easy installation of the tile system. A further embodiment of the tile system is possible wherein the first coupling profile and the third coupling profile of at least one tile are substantially identical, and wherein the second coupling profile and the fourth coupling profile of said tile are substantially identical. This may be advantageous for the ease and speed of production of the tiles.

In yet a further embodiment of the tile system is it possible that the tile system comprises different types of tiles (A and B respectively), wherein the size of a first type of tile (A) differs from the size of second type of tile (B). Distinctive visual markings may be applied to different tile types, preferably for installation purposes. To this end, distinctive visual markings are preferably applied to the upward tongue of at least one first coupling profile of each tile type.

The ordinal numbers used in this document, like "first", "second", "third", and "fourth" are used only for identification purposes. The use of the expressions "third locking element" and "fourth locking element" does therefore not necessarily require the co-presence of a "first locking element" and a "second locking element".

The invention also relates to a tile covering, in particular floor covering, wall covering, ceiling covering and/or furniture covering, consisting of mutually coupled tiles according to the invention. The invention also relates to a tile for use in multi-purpose tile system according to the invention.

Further embodiments of the invention are presented in the non-limitative clauses presented below:

1. Multi-purpose tile system, in particular a floor tile system, comprising a plurality of multi-purpose tiles, in particular floor tiles, wherein said tiles are configured to being joined in a chevron pattern, wherein each tile comprises:
   a first pair of opposing edges consisting of a first edge and an opposite second edge;
   a second pair of opposing edges consisting of a third edge and an opposing fourth edge,
   wherein:
   the first edge and the third edge enclose a first acute angle, and wherein the second edge and the fourth edge enclose a second acute angle opposing said first acute angle, and wherein the second edge and the third edge enclose a first obtuse angle, and wherein the first edge and the fourth edge enclose a second obtuse angle opposing said first obtuse angle, and
   wherein
   the first pair of opposing edges have pairs of opposing first mechanical coupling means for locking together said tiles at least vertically, and preferably also horizontally, comprising:
       a first coupling profile, comprising an upward tongue, and
       a second coupling profile, comprising a downward tongue,
       and
   the second pair of opposing edges have pairs of opposing second mechanical coupling means for locking together said tiles at least vertically, and preferably also horizontally, comprising:
       a third coupling profile, comprising an upward tongue, and
       a fourth coupling profile, comprising a downward tongue,
       wherein the first coupling profile of the tile to be coupled is adapted for co-action with the second and/or fourth coupling profile of another tile for mutual locking of the first coupling profile and the second and/or fourth coupling profile, wherein
       the third coupling profile of the tile to be coupled is adapted for co-action with the second and/or fourth coupling profile of another tile for mutual locking of the third coupling profile and the second and/or fourth coupling profile,
       wherein the second and fourth coupling profile allow locking together said tiles during substantially vertically downward movement of a tile towards the first and/or third coupling profile of a further tile, leading to locking of the coupled coupling profiles, wherein each tile comprises a substantially rigid base layer at least partially made of a composite material comprising at least one plastic material.

2. Tile system according to clause 1, wherein the system comprises two different types of tiles (A and B respectively), and wherein the first mechanical coupling means of one type of tile along the first pair of opposite edges are arranged in a mirror-inverted manner relative to the corresponding first mechanical coupling means along the same first pair of opposite edge portions of the other type of tile.

3. Tile system according to clause 1 or 2, wherein at least one tile has a configuration wherein:
   the first coupling profile is arranged at the first edge;
   the second coupling profile is arranged at the second edge;
   the third coupling profile is arranged at the third edge; and
   the fourth coupling profile is arranged at the fourth edge.

4. Tile system according to one of the foregoing clauses, wherein at least one tile has a configuration wherein:
   the first coupling profile is arranged at the second edge;
   the second coupling profile is arranged at the first edge;
   the third coupling profile is arranged at the third edge; and
   the fourth coupling profile is arranged at the fourth edge.

5. Tile system according to one of the foregoing clauses, wherein the first coupling profile and/or the third coupling profile comprises:
   at least one upward flank lying at a distance from the upward tongue and an upward groove formed between the upward tongue and the upward flank, wherein at least a part of a side of the upward tongue facing the upward flank is inclined upwardly towards the upward flank, and wherein at least a part of a side of the upward tongue facing away from the upward flank optionally comprises at least one first locking element, which preferably makes integral part of the upward tongue,
   and wherein the second coupling profile and/or fourth coupling profile comprises:
   at least one downward flank lying at a distance from the downward tongue, and a downward groove formed between the downward tongue and the downward flank, wherein at least a part of a side of the downward tongue facing the downward flank is inclined downwardly towards the downward flank, and wherein the downward flank optionally comprises at least one second locking element, which preferably makes integral part of the downward flank, and adapted for co-action with the at least one first locking element of yet a further tile.

6. Tile system according to one of the foregoing clauses, wherein the third coupling profile comprises:
at least one upward flank lying at a distance from the upward tongue and an upward groove formed between the upward tongue and the upward flank, wherein, preferably, at least a part of a side of the upward tongue facing the upward flank is inclined toward the upward flank, and wherein at least a part of a side of the upward tongue facing away from the upward flank comprises at least one third locking element, which preferably makes integral part of the upward tongue,
and wherein the fourth coupling profile comprises:
at least one downward flank lying at a distance from the downward tongue, and a downward groove formed between the downward tongue and the downward flank, wherein, preferably, at least a part of a side of the downward tongue facing the downward flank is inclined toward the downward flank, and wherein the downward flank comprises at least one fourth locking element, which preferably makes integral part of the downward flank, and adapted for co-action with the at least one third locking element of yet a further tile.

7. Tile system according to one of the foregoing clauses, wherein the coupling profiles are designed such that locking of the second coupling profile of a tile with a first coupling profile of another tile can take place substantially simultaneously with the locking of the fourth coupling profile of the tile with the third coupling profile of yet another tile.

8. Tile system according to one of the foregoing clauses, wherein the length of the first edge and the length of the second edge of a tile are substantially identical.

9. Tile system according to one of the foregoing clauses, wherein the length of the first edge and the length of the second edge of a tile are greater than the length of the third edge and the fourth edge of said tile.

10. Tile system according to one of the foregoing clauses, wherein the first acute angle and the second acute angle are situated between 30 and 60 degrees, and are preferably substantially 45 degrees.

11. Tile system according to one of the foregoing clauses, wherein the first obtuse angle and the second obtuse angle are situated between 120 and 150 degrees, and are preferably substantially 135 degrees.

12. Tile system according to one of the foregoing clauses, wherein the substantially rigid base layer of at least one tile comprises between 0 and 10% of plasticizer.

13. Tile system according to one of the foregoing clauses, wherein at least one tile comprises at least one upper substrate affixed to an upper side the base layer, wherein said upper substrate preferably comprises a decorative layer.

14. Tile system according to clause 13, wherein the at least one upper substrate comprises:
a decorative layer and
an abrasion resistant wear layer covering said decorative layer, wherein a top surface of said wear layer is the top surface of said tile, and wherein the wear layer is a transparent material, such that decorative layer is visible through the transparent wear layer,
and, optionally, a transparent finishing layer situated in between the decorative layer and the wear layer.

15. Tile system according to clause 13 or 14, wherein the upper substrate is at least partially made of at least one material selected from the group consisting of: metals, alloys, macromolecular materials such as vinyl monomer copolymers and/or homopolymers; condensation polymers such as polyesters, polyamides, polyimides, epoxy resins, phenol-formaldehyde resins, urea formaldehyde resins; natural macromolecular materials or modified derivatives thereof such as plant fibres, animal fibres, mineral fibres, ceramic fibres and carbon fibres.

16. Tile system according to in clause 15, wherein the vinyl monomer copolymers and/or homo-polymers are selected from the group consisting of polyethylene, polyvinyl chloride, polystyrene, polymethacrylates, polyacrylates, polyacrylamides, ABS, (acrylonitrile-butadiene-styrene) copolymers, polypropylene, ethylene-propylene copolymers, polyvinylidene chloride, polytetrafluoroethylene, polyvinylidene fluoride, hexafluoropropene, and styrene-maleic anhydride copolymers.

17. Tile system according to one of clauses 13-16, wherein the at least one upper substrate is affixed to the upper side of the base layer by means of an adhesive.

18. Tile system according to one of clauses 13-17, wherein at least one tile comprises a plurality of strip shaped upper substrates affixed to an upper side the base layer, wherein said upper substrate are arranged side by side in the same plane, preferably in a parallel configuration.

19. Tile system according to clause 18, wherein the plurality of upper substrates substantially completely cover the upper surface of the base layer.

20. Tile system according to clause 18 or 19, wherein each of the plurality of upper substrates extends from the first edge to the second edge of the tile.

21. Tile system according to one of clauses 18-20, wherein each of the plurality of upper substrates comprises a decorative layer, wherein the decorative layers of at least two adjacently arranged upper substrates have different appearances.

22. Tile system according to one of the foregoing clauses, wherein each tile comprises at least one backing layer affixed to a bottom side of the base layer, wherein said at least one backing layer at least partially made of a flexible material, preferably an elastomer.

23. Tile system according to clause 22, wherein the thickness of the backing layer is at least 0.5 mm.

24. Tile system according to one of the foregoing clauses, wherein each tile comprises at least one reinforcing layer, wherein the density of the reinforcing layer is preferably situated between 1000 and 2000 kg/m3, preferably between 1400- and 1900 kg/m3, and more preferably between 1400-1700 kg/m3.

25. Tile system according to one of the foregoing clauses, wherein at least a part of the first coupling profile and/or at least a part of second coupling profile of each tile is integrally connected to the base layer, and/or wherein at least a part of the third coupling profile and/or at least a part of fourth coupling profile of each tile is integrally connected to the base layer.

26. Tile system according to one of the foregoing clauses, wherein the first coupling profile and/or the second coupling profile allows deformation during coupling and uncoupling, and/or wherein the third coupling profile and/or the fourth coupling profile allows deformation during coupling and uncoupling.

27. Tile system according to one of the foregoing clauses, wherein at least one coupling profile of the first coupling profile and second coupling profile comprises a bridge connecting the tongue of said coupling profile to the base layer, wherein the minimum thickness of the bridge is smaller than the minimum width of the tongue, and/or wherein at least one coupling profile of the third coupling profile and fourth coupling profile comprises a bridge connecting the tongue of said coupling profile to the base layer, wherein the minimum thickness of the bridge is smaller than the minimum width of the tongue.

28. Tile system according to one of the foregoing clauses, wherein the second coupling profile comprises an upper bridge connecting the downward tongue to the base layer, wherein the upper bridge is configured to deform during coupling of adjacent tiles, to widen the downward groove, and wherein, preferably, a lower side of the upper bridge of the second coupling profile is at least partially inclined, and preferably wherein the upper side of the upward tongue is at least partially inclined, wherein the inclination of the upper side of the upward tongue and the inclination of the bridge part of the second coupling profile are substantially similar, wherein both inclinations for instance mutually enclose an angle between 0 and 5 degrees.

29. Tile system according to one of the foregoing clauses, wherein the fourth coupling profile comprises an upper bridge connecting the downward tongue to the base layer, wherein the upper bridge is configured to deform during coupling of adjacent tiles, to widen the downward groove, and wherein, preferably, a lower side of the upper bridge of the second coupling profile is at least partially inclined and preferably wherein the upper side of the upward tongue is at least partially inclined, wherein the inclination of the upper side of the upward tongue and the inclination of the bridge part of the second coupling profile art are substantially similar, wherein both inclinations for instance mutually enclose an angle between 0 and 5 degrees.

30. Tile system according to one of the foregoing clauses, wherein the first locking element comprises at least one outward bulge, and that the second locking element comprises at least one recess, which outward bulge is adapted to be at least partially received in a recess of an adjacent coupled tile for the purpose of realizing a locked coupling.

31. Tile system according to one of clauses 5-30, wherein a side of the downward tongue of the second coupling profile facing away from the downward flank is provided with a first secondary locking element, and wherein the upward flank is provided with a second secondary locking element, said first secondary locking element being adapted to cooperate with a second secondary locking element of another tile.

32. Tile system according to clause 31, wherein the co-action between the third locking element and the first secondary locking element, in coupled condition of two tiles, defines a tangent T1 which encloses an angle A1 with a plane defined by the tile, which angle A1 is smaller than an angle A2 enclosed by said plane defined by the tile and a tangent T2 defined by a co-action between an inclined part of a side of the upward tongue facing toward the upward flank and an inclined part of a side of the downward tongue facing toward the downward flank.

33. Tile system according to clause 32, wherein the greatest difference between angle A1 and angle A2 is situated between 5 and 10 degrees.

34. Tile system according to one of clauses 31-33, wherein the shortest distance between an upper edge of the downward tongue and a lower side of the base layer defines a plane, wherein the first secondary locking element and at least a part of the downward tongue are situated at opposite sides of said plane.

35. Tile system according to one of clauses 31-34, wherein the minimum distance between said first secondary locking element and an upper side of the tile is smaller than the minimum distance between an upper side of the upward tongue and said upper side of the tile.

36. Tile system according to one of the foregoing clauses, wherein the base layer of at least one tile is at least partially made of polyvinyl chloride (pvc).

37. Tile system according to one of the foregoing clauses, wherein the base layer of at least one tile comprises a stone plastic composite (SPC).

38. Tile system according to one of the foregoing clauses, wherein the base layer of at least one tile comprises a wood plastic composite (WPC).

39. Tile system according to one of the foregoing clauses, wherein at least a number of tiles is identical.

40. Tile system according to one of the foregoing clauses, wherein the first coupling profile and the third coupling profile of at least one tile are substantially identical, and wherein the second coupling profile and the fourth coupling profile of said tile are substantially identical.

41. Tile system according to any of the foregoing clauses, wherein the tile system comprises different types of tiles (A and B respectively), wherein the size of a first type of tile (A) differs from the size of second type of tile (B).

42. Tile system according to one of the foregoing clauses, wherein distinctive visual markings are applied to different tile types, preferably for installation purposes.

43. Tile system according to clause 42, wherein distinctive visual markings are applied to the upward tongue of at least one first coupling profile of each tile type.

44. Tile covering, in particular floor covering, ceiling covering, or wall covering, consisting of mutually coupled tiles according to any of the clauses 1-43.

45. Tile for use in multi-purpose tile system according to one of clauses 1-43.

BRIEF DESCRIPTION OF THE DRAWINGS

The invention will be elucidated on the basis of non-limitative exemplary embodiments shown in the following figures. Herein show(s):

FIGS. 2a and 2b an alternative configuration of the mechanical coupling means as shown in FIGS. 2a and 2b;

DESCRIPTION OF THE INVENTION

Figure 1:
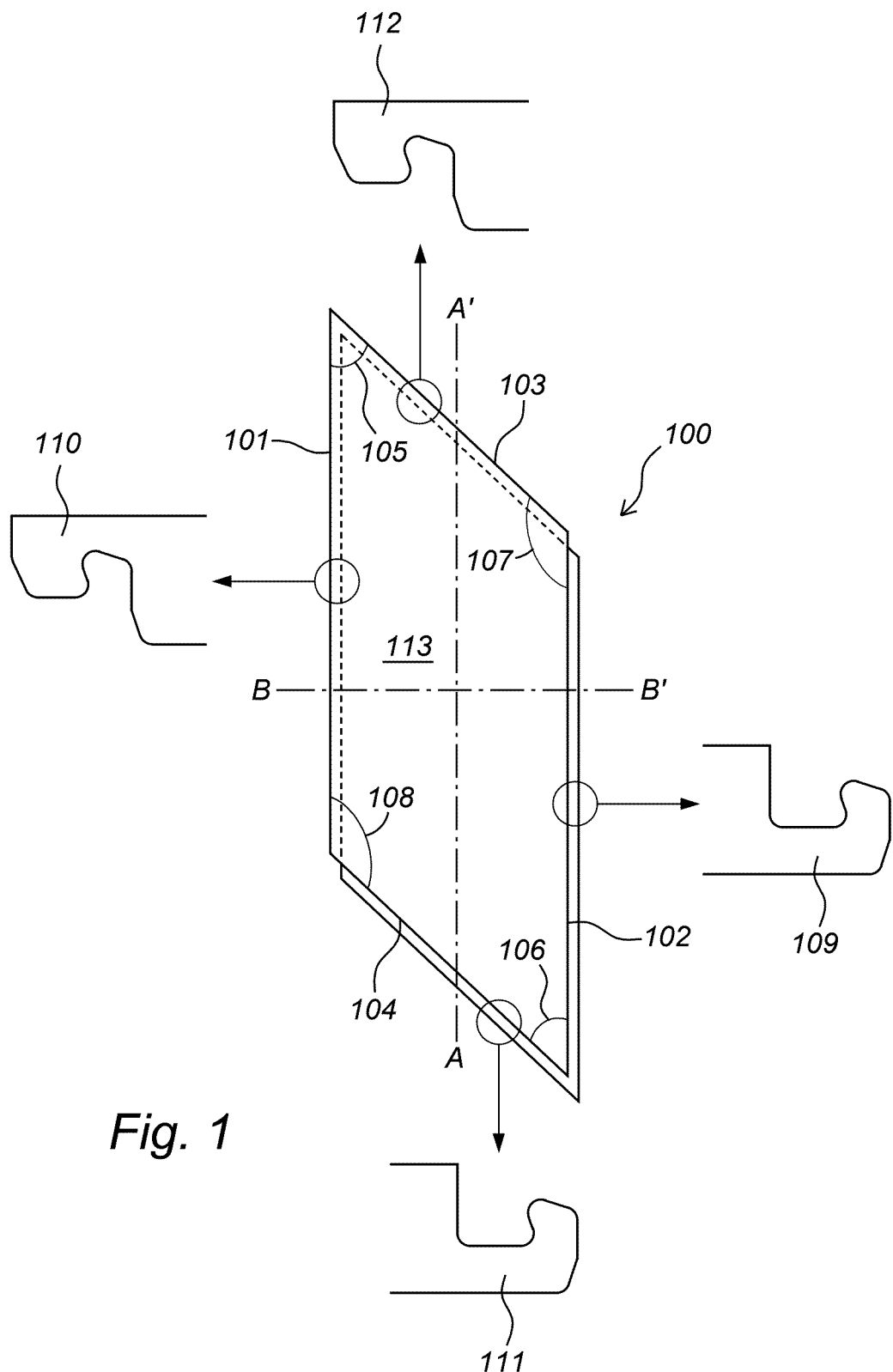
FIG. 1 a schematic representation of a tile for use in multi-purpose tile system according to the invention.

FIG. 1 shows a schematic representation of the general configuration of a tile 100 for use in a multi-purpose tile system, in particular a floor tile system according to the invention. The figure shows a tile 100 comprising a first pair of opposing edges consisting of a first edge 101 and an opposite second edge 102 and a second pair of opposing edges consisting of a third edge 103 and an opposing fourth edge 104. The first edge 101 and the third edge 103 enclose a first acute angle 105, and the second edge 102 and the fourth edge 104 enclose a second acute angle 106 opposing said first acute angle 105. The second edge 102 and the third edge 103 enclose a first obtuse angle 107, and the first edge 101 and the fourth edge 104 enclose a second obtuse angle 108 opposing said first obtuse angle 107. Both the first pair of opposing edges 101, 102 and the second pair of opposing edges 103, 104 have mechanical coupling means for locking purposes. FIG. 1 shows schematically and indicative how the mechanical coupling means of the tile 100 can be realised. The second edge 102 comprises a first coupling profile 109, comprising an upward tongue. The first edge 101 comprises a second coupling profile 110, comprising a downward tongue. The second coupling profile 110 is adapted for co-action with a first coupling profile 109 of another tile for mutual locking of the first coupling profile 109 and the second coupling profile 110. The second coupling profile 110 in particular allows locking together two tiles during substantially vertically downward movement of a tile towards the first coupling profile 109 of a further tile, leading to locking of the first coupling profile 109 and the second coupling profile 110. The fourth edge 104 comprises a third coupling profile 111, comprising an upward tongue. The third edge 103 comprises a fourth coupling profile 112, comprising a downward tongue. The fourth coupling profile 112 of the tile to be coupled is adapted for co-action with the third coupling profile 111 of another tile for mutual locking of the third coupling profile 111 and the fourth coupling profile 112, wherein the fourth coupling profile 112 allows locking together said tiles during substantially vertically downward movement of the tile towards the third coupling profile 111 of a yet another tile, leading to locking of the third coupling profile 111 and the fourth coupling profile 112. The tile 100 generally comprises a substantially rigid base layer at least partially made of a composite material comprising at least one plastic material. Cross-sections of lines A-A' and B-B' and alternatives thereof are schematically shown in FIGS. 2*a*-2*d*. Installation of the tile system by interconnecting multiple tiles 100 in order to create a tile covering can be realized by substantially vertically downward movement, or drop down movement of a first tile 100 towards an already installed second tile 100, where a downward tongue 110 of the first mechanical coupling means of the first tile 100 will co-act with an upward tongue 109 of the first mechanical coupling means of a second tile 100 such that mutual locking of said tiles is obtained. During this vertically downward movement of the first tile 100 towards the second tile 100, the downward tongue 112 of the second mechanical coupling means of the first tile 100 can be connected (simultaneously) with an upward tongue 111 of the second mechanical coupling means of an another already installed third tile 100. Coupling of the tiles 100 can therefore basically be done via vertical folding of the tiles 100.

Figure 2A:
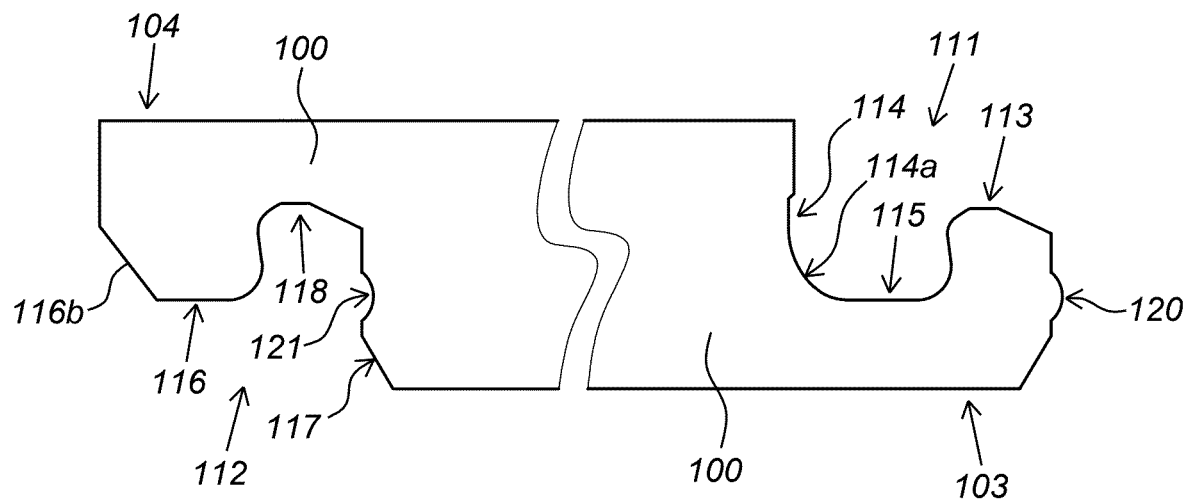
FIGS. 2a and 2b a schematic representation of a possible embodiment of the mechanical coupling means which can be present at the edges of the tile shown in FIG. 1.
Figure 2B:
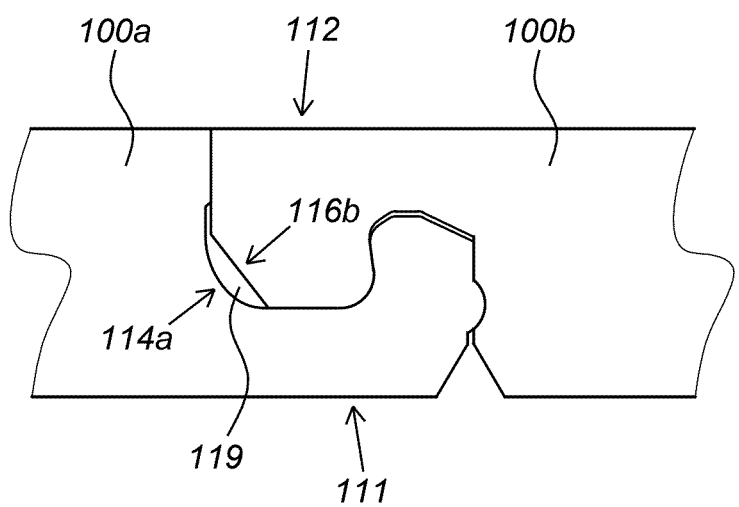

FIGS. 2*a* and 2*b* show a schematic representation of a possible embodiment of the mechanical coupling means which can be present at cross-section A-A' of the tile 100 shown in FIG. 1. Despite the figures indicating the A-A' cross-section of the tile 100 it is possible the mechanical coupling means as shown in FIGS. 2*a* and 2*b* are present at the edges shown in cross-section B-B'. The figure shows the third edge 103 comprising a fourth coupling profile 112 and the fourth edge 104 comprising a third coupling profile 111. FIG. 2*b* shows a schematic representation of the coupled position of two tiles 100*a*, 100*b* comprising coupling profiles 111, 112 as shown in FIG. 2*a*. The third coupling profile comprises an upward tongue 113, an upward flank 114 lying at a distance from the upward tongue 113 and an upward groove 115 formed between the upward tongue 113 and the upward flank 114. The fourth coupling profile 112 comprises a downward tongue 116, a downward flank 117 lying at a distance from the downward tongue 116, and a downward groove 118 formed between the downward tongue 116 and the downward flank 117. A side 116*b* facing away from the downward flank 117 is diagonally oriented. The side 116*b* has a substantially straight design, where the complementary side 114*a* of the upward flank 114 has a rounded design. An air gap 119 is formed in the coupled position shown in FIG. 2*b*. The third coupling profile 111 comprises a first locking element 120 which is adapted for co-action with a second locking element 121 which is provided in the flank 117 of the fourth coupling profile 112. The first locking element 120 comprises an outward bulge, and the second locking element 121 comprises a recess, which outward bulge is adapted to be at least partially received in a recess of an adjacent coupled tile for the purpose of realizing a locked coupling. FIG. 2*b* shows a tile 100*b* being coupled with an adjacent tile 100*a*, leading to locking of the third coupling profile 111 and the fourth coupling profile 112. The tongues 113, 116, flanks 114, 117 and grooves 115, 118 of the embodiments shown in FIGS. 2*a-b* have a substantially rounded design. However, it is also possible that the tongues 113, 116, flanks 114, 117 and/or grooves 115, 118 have a more rectilinear design.

Figure 2C:
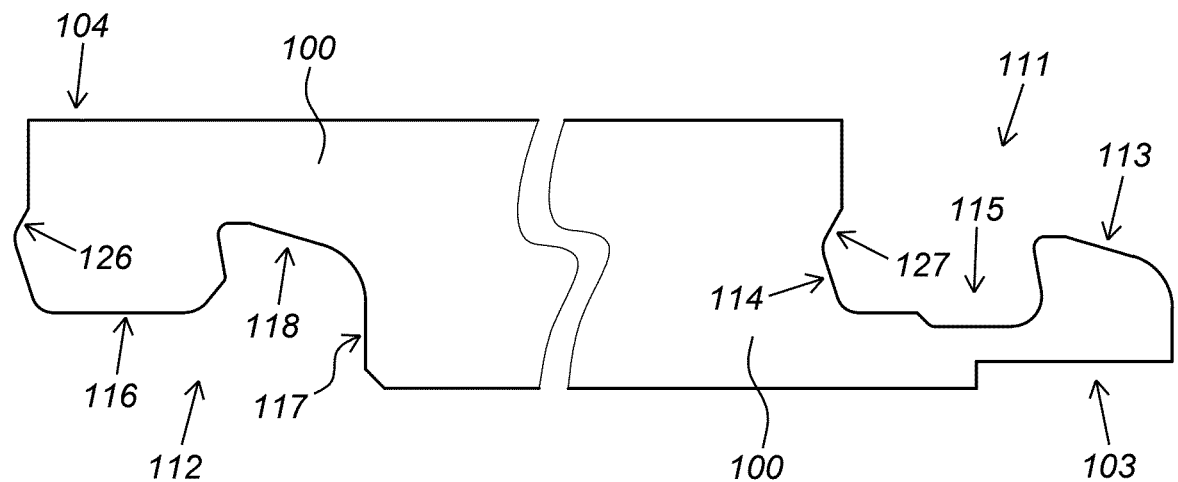
Figure 2D:
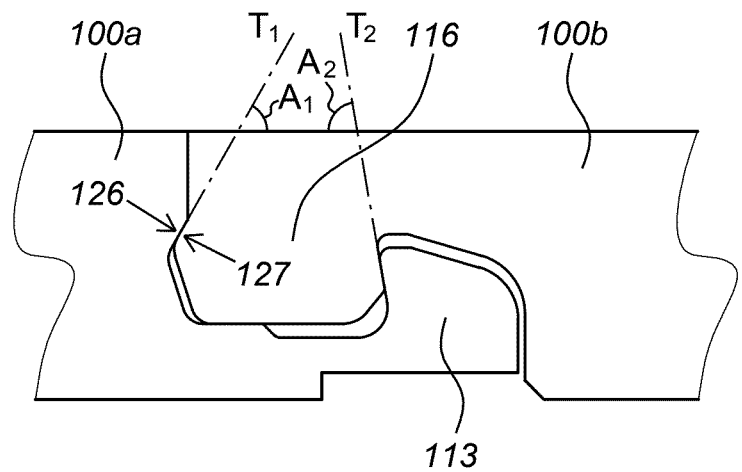

FIG. 2*c* shows a schematic representation of a an alternative configuration of the tile 100 equivalent to the tile 100 shown in FIGS. 2*a* and 2*b*, wherein the figure shows a possible cross-section of line A-A' of the tile 100 shown in FIG. 1. As indicated before, it is also possible that the mechanical coupling means as shown in FIGS. 2*c* and 2*d* are present at the edges shown in cross-section B-B'. Similar reference numbers show similar or equivalent technical features. The third edge 103 comprises a fourth coupling profile 112 and the fourth edge 104 comprises a third coupling profile 111. FIG. 2*d* shows a schematic representation of the coupled position of two tiles 100*a*, 100*b* comprising coupling profiles 111, 112 as shown in FIG. 2*c*. The third coupling profile comprises an upward tongue 113, an upward flank 114 lying at a distance from the upward tongue 113 and an upward groove 115 formed between the upward tongue 113 and the upward flank 114. The fourth coupling profile 112 comprises a downward tongue 116, a downward flank 117 lying at a distance from the downward tongue 116, and a downward groove 118 formed between the downward tongue 116 and the downward flank 117. In the shown embodiment a side of the downward tongue 116 facing away from the downward flank 117 is provided with a third locking element 126, and the upward flank 114 is provided with a fourth locking element 127, said third locking element 126 being adapted to cooperate with a fourth locking element 127 of another tile 100. This would result in an additional inner locking mechanism, which could further improve the stability and reliability of the coupling. The co-action between the third locking element 126 and the fourth locking element 127, in coupled condition of two tiles, defines a tangent T1 which encloses an angle A1 with a plane defined by the tile, which angle A1 is smaller than an angle A2 enclosed by said plane defined by the tile and a tangent T2 defined by a co-action between an inclined part of a side of the upward tongue 113 facing toward the upward flank 114 and an inclined part of a side of the downward tongue 116 facing toward the downward flank 117. In general, the greatest difference between angle A1 and angle A2 is situated between 5 and 10 degrees.

Figure 3:
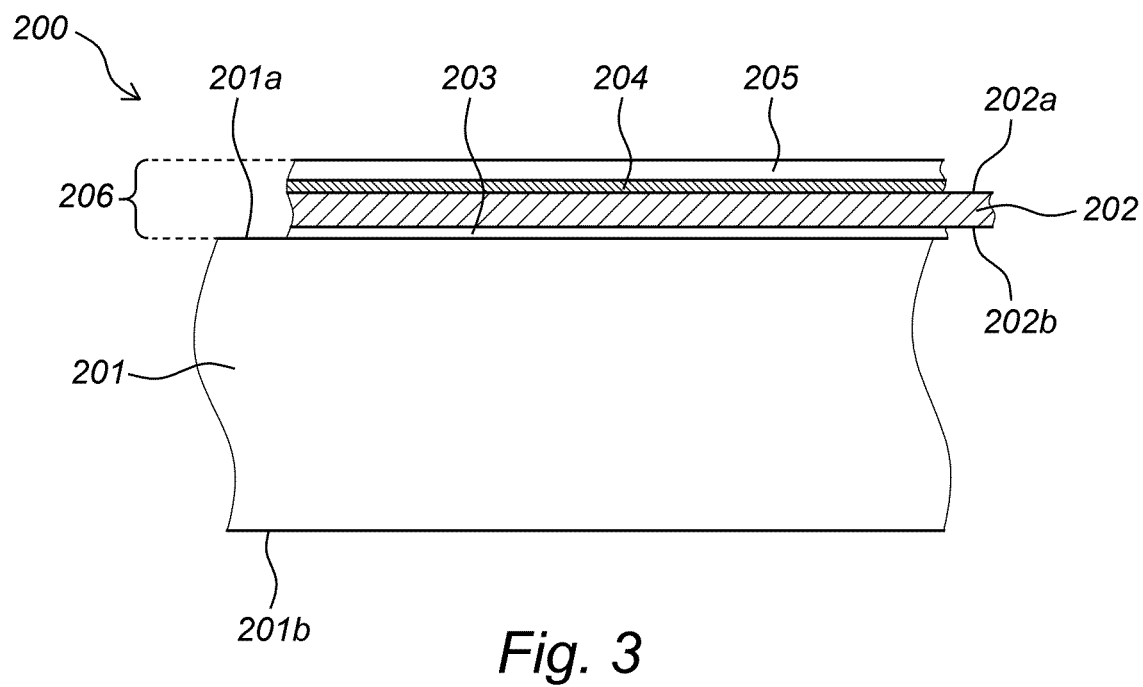
FIG. 3 a schematic representation of a side view of the laminate details of a first possible embodiment of a tile according to the invention.

FIG. 3 show a schematic representation of a side view of the laminate details of a first possible embodiment of a tile 200 according to the invention. The tile 200 comprises a substantially rigid base layer 201 at least partially made of a composite material comprising at least one plastic material. The base layer 201 can for example comprise PVC, SPC and/or WPC. The base layer 201 comprises a lower side or bottom surface 201b and an upper side 201a. The coupling profiles are generally provided at the rigid base layer 201. The tile 100 comprises an upper substrate 202 affixed to the upper side 201a of the base layer 201. An adhesive 203, which can be a layer or coating, is provided between the upper surface 201a of the rigid base layer 201 and the lower surface 202b of the upper substrate layer 202 to join the upper substrate layer 202 and the rigid base layer 201 together. The tile 200 can possibly include a design pattern or a decorative appearance of any selected type on or at the upper surface 202a of the substrate layer 202. The design pattern can be a wood grain design, a mineral grain design that resembles marble, granite or any other natural stone grain, or a colour pattern, colour blend or single colour to name just a few design possibilities. The decoration or design pattern can be printed onto or otherwise applied to the upper surface 202a of the upper substrate layer 202, but is preferably provided on a separate printing film or decorative layer 204 of any suitable known plastic material. The decorative layer 204 is covered by a transparent or semi-transparent abrasion resistant wear layer 205 of known material and fabrication through which the design layer 204 can be viewed. The top of the wear layer 205 is the top surface of the tile 100. Possibly a transparent finishing layer (not shown) can be situated in between the decorative layer 204 and the wear layer 205. The tile 100 can be provided with any of the coupling elements shown in the previous figures. The upper substrate layer 202, the design layer 204 and the wear layer 205 can be initially laminated together to form an upper substrate laminate subassembly 206. The laminate subassembly 206 and the base layer 201 can then be laminated together to form the tile 100.

Figure 4:
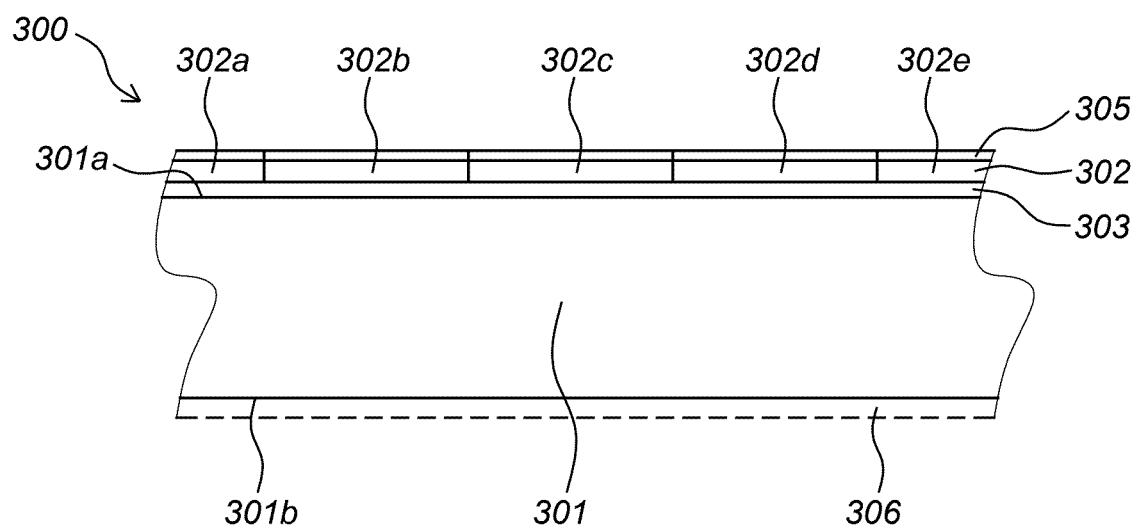
FIG. 4 a schematic representation of a side view of the laminate details of a second possible embodiment of a tile according to the invention.

FIG. 4 show a schematic representation of a side view of the laminate details of a second possible embodiment of a tile 300 according to the invention. The tile 300 comprises a substantially rigid base layer 301 at least partially made of a composite of at least one plastic material and optionally at least one filler. The base layer 301 can for example comprise PVC, SPC and/or WPC. The tile 300 comprises a plurality of strip shaped upper substrates 302a-e affixed to the upper side 301a of the base layer 301. The plurality of strip shaped upper substrates 302a-e can be pre-assembled before they are affixed to the base layer 301. The upper substrates 302a-e are affixed to the upper side 301a of the base layer 301 by means of an adhesive 303. However, it is also possible that the upper substrates 302a-e are affixed to the upper side 301a of the base layer 301 by means of a high pressure and high pressure treatment. The upper substrates 302a-e are covered by a transparent or semi-transparent abrasion resistant wear layer 305 of known material and fabrication. The upper substrates 302a-e have a parallel orientation. The profiling of a tile 300 is generally done after the laminating of the tile 300. The coupling profile will provided in the rigid base layer 301. If an underlayment 306 or backing 306 (shown in dotted lines) is used, the underlayment 306 is affixed to a lower side 301b of the base layer 301 after the profiling step. The underlayment 306 can for example be made of polyethylene (PE), polyurethane or cork.

Figure 5A:
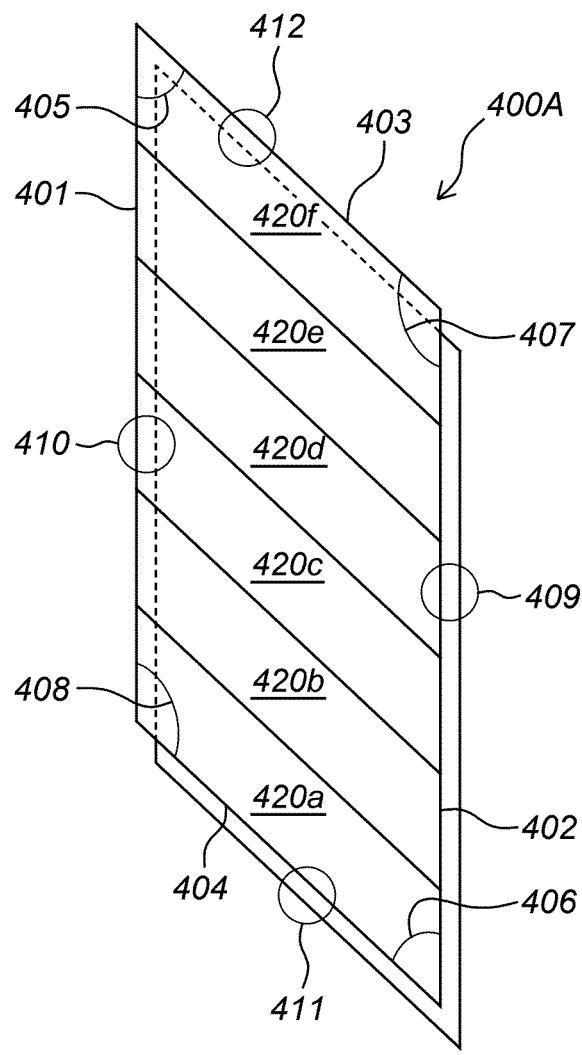
FIGS. 5a and 5b a schematic representations of two different types of tile configurations.
Figure 5B:
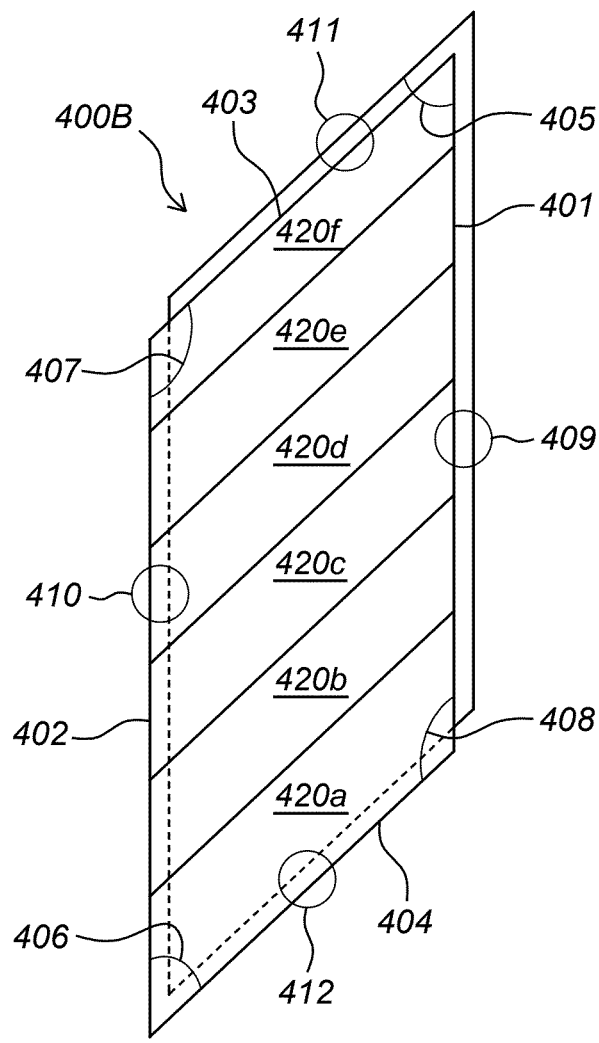

FIGS. 5a and 5b show schematic representations of two different types of tile configurations, wherein the first mechanical coupling means of one type of tile (A) along the first pair of opposite edges are arranged in a mirror-inverted manner relative to the corresponding first mechanical coupling means along the same first pair of opposite edge portions of the other type of tile (B). The figures show a top view. FIG. 5a shows a tile 400A wherein the first coupling profile 409 is arranged at the second edge 402, the second coupling profile 410 is arranged at the first edge 401, the third coupling profile 411 is arranged at the fourth edge 404 and the fourth coupling profile 412 is arranged at the third edge 403. FIG. 5b shows a tile 400B with a configuration wherein the first coupling profile 409 is arranged at the first edge 401, the second coupling profile 410 is arranged at the second edge 402, the third coupling profile 411 is arranged at the third edge 403 and the fourth coupling profile 412 is arranged at the fourth edge 404. Each tile 400A, 400B comprises a substantially rigid base layer at least partially made of a composite material comprising at least one plastic material. Each tile 400A, 400B furthermore comprises a plurality of strip shaped upper substrates 420a-f affixed to an upper side of the base layer, wherein said upper substrates 420a-f are arranged side by side in the same plane in a parallel configuration. Both the tiles 400A, 400B and the strip shaped upper substrates 420a-f have the shape of a parallelogram. When interconnecting multiple tiles 400A, 400B as shown in FIGS. 5a and 5b, the upper substrates 420a-f will form a chevron pattern. This will be shown in more detail in FIGS. 6 and 8. The upper substrates 420a-f comprise a decorative layer and an abrasion resistant wear layer covering said decorative layer. From aesthetic point of view it is desirable is the decorative layers of at least two adjacently arranged upper substrates 420a-f have different appearances as this may accentuate the chevron pattern. The plurality of upper substrates 420a-f substantially completely cover the upper surface of the base layer of the tiles 400A, 400B. Each of the plurality of upper substrates 420a-f therefore extends from the first edge 401 to the second edge 402 of the tile 400A, 400B. The upper substrates 420a-e have a parallel orientation wherein the longitudinal direction of each upper substrate 420a-e is in line with the third edge 403 and the fourth edge 404 of the tile 400A, 400B. The ideal number and dimensions of upper substrates 420a-f is amongst others dependent on the dimensions of the tile 400A, 400B. In the shown embodiments of tiles 400A, 400B is the length of the first edge 401 of a tile 400A, 400B substantially identical to the length of the second edge 402 of the tile 400A, 400B. This length is greater than the length of the third edge 403 and the fourth edge 404 of said tile 400A, 400B. The first acute angle 405 and the second acute angle 406 are situated between 30 and 60 degrees, and are preferably substantially 45 degrees. The first obtuse angle 407 and the second obtuse angle 408 are situated between 120 and 150 degrees, and are preferably substantially 135 degrees.

Figure 6:
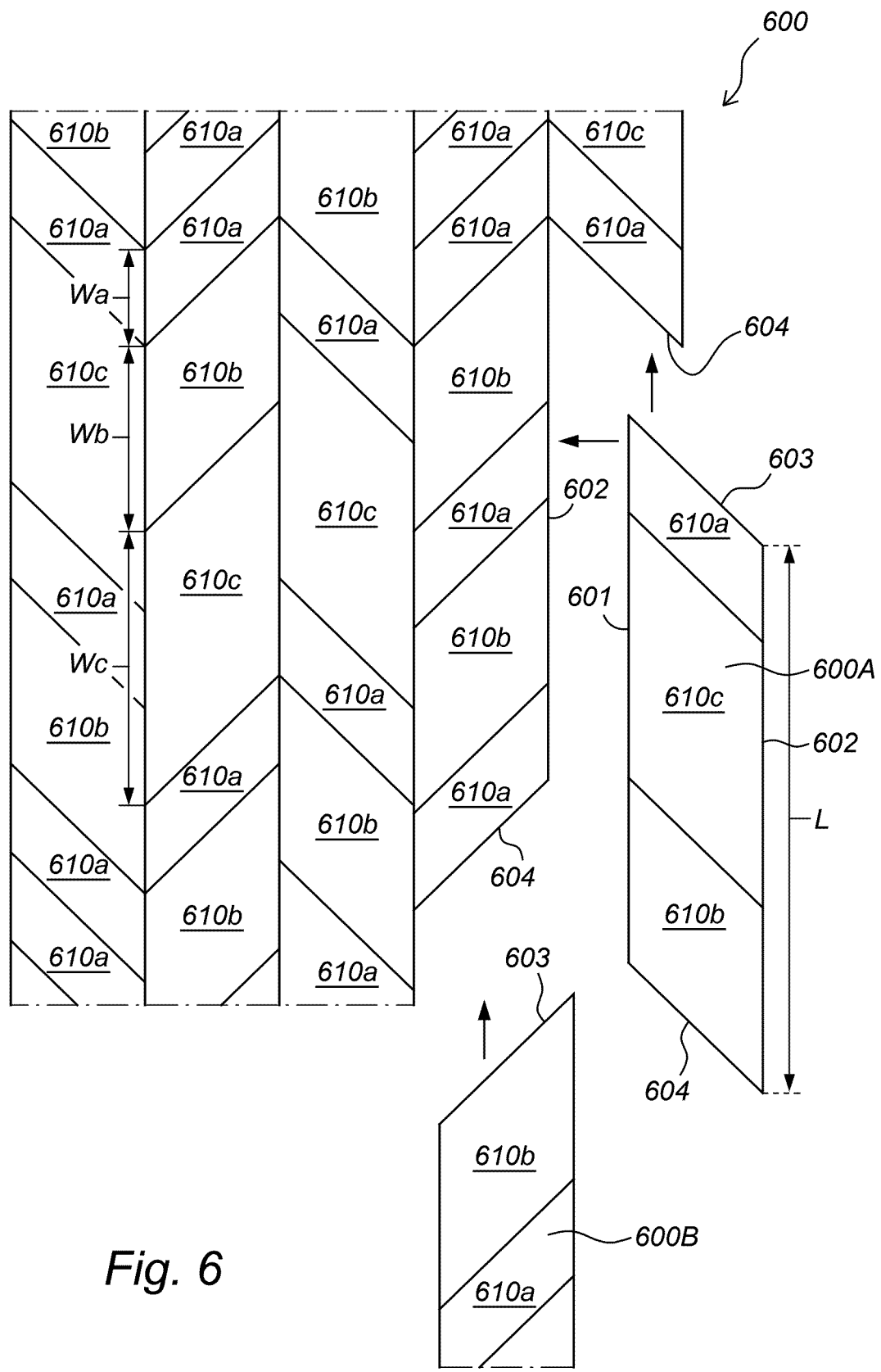
FIG. 6 a schematic representation of a first example of a multi-purpose tile system according to the invention.

FIG. 6 shows a schematic representation of a first example of a multi-purpose tile system 600 according to the invention comprising a plurality of multi-purpose tiles 600A, 600B. The figure shows a top view. The tiles 600A, 600B are equivalent to the tiles shown in FIGS. 5a and 5b having equivalent coupling profiles at the first, second, third and fourth edge 601, 602, 603, 604, of which examples are also shown in FIGS. 1-2d. The multi-purpose tile system 600 shows non-uniformity of the upper substrates 610a, 610b, 610c of the tiles 600A, 600B. Each tile 600A, 600B comprises a plurality of strip shaped upper substrates 610a-c affixed to an upper side of the base layer. The upper substrates 610a-c are parallel oriented to each other. The number of upper substrates 610a-c can vary per tile 600A, 600B as the width Wa, Wb, Wc of the upper substrates 610a-c can vary. The width Wa, Wb, Wc is defined in a longitudinal direction L of the tile 600A, 600B. When the tiles 600A, 600B are in a joined configuration, as is for example shown in the left side of the figure, the plurality of upper substrates 610a-c form a non-uniform pattern of upper substrates 610a-c. Despite the upper substrates 610a-c shown all have a parallelogrammatic shape, it is also possible that the shape of the upper substrate deviates thereof.

Figure 7:
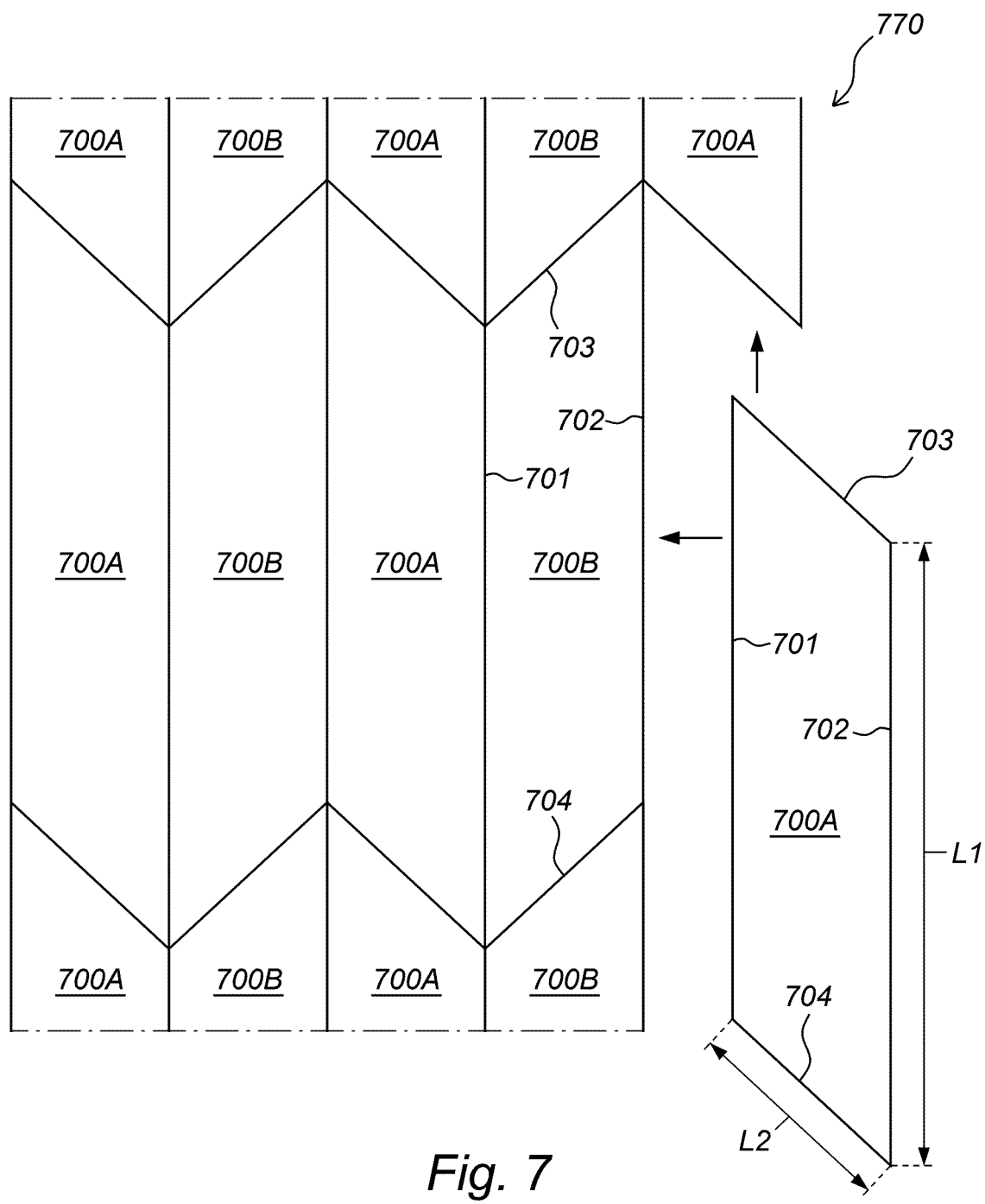
FIG. 7 a schematic representation of a second example of a multi-purpose tile system according to the invention.

FIG. 7 shows a schematic representation of a second example of a multi-purpose tile system 770 according to the invention comprising a plurality of multi-purpose tiles 700A, 700B. The figure shows a top view. The tiles 700A, 7600B are equivalent to the tile shown in FIG. 1 having equivalent coupling profiles at the first, second, third and fourth edge 601, 602, 603, 604, of which examples are also shown in FIGS. 1-2d. The system 770 comprises two different types of tiles 700A, 700B. In the shown embodiments of tiles 700A, 700B are the lengths (L1) of the first edge 701 and the second edge 702 of a tile 700A, 700B significantly greater than the length (L2) of the third edge 703 and the fourth edge 704 of said tile 700A, 700B. The arrows indicate the displacement direction of the non-coupled tile 700A before coupling. Once the tile 700A is aligned with the yet coupled tiles 700B, 700B said con-coupled tile 700A can be substantially vertically moved downwards towards the first coupling profiles of the yet coupled tiles, leading to locking of the coupling profiles.

Figure 8:
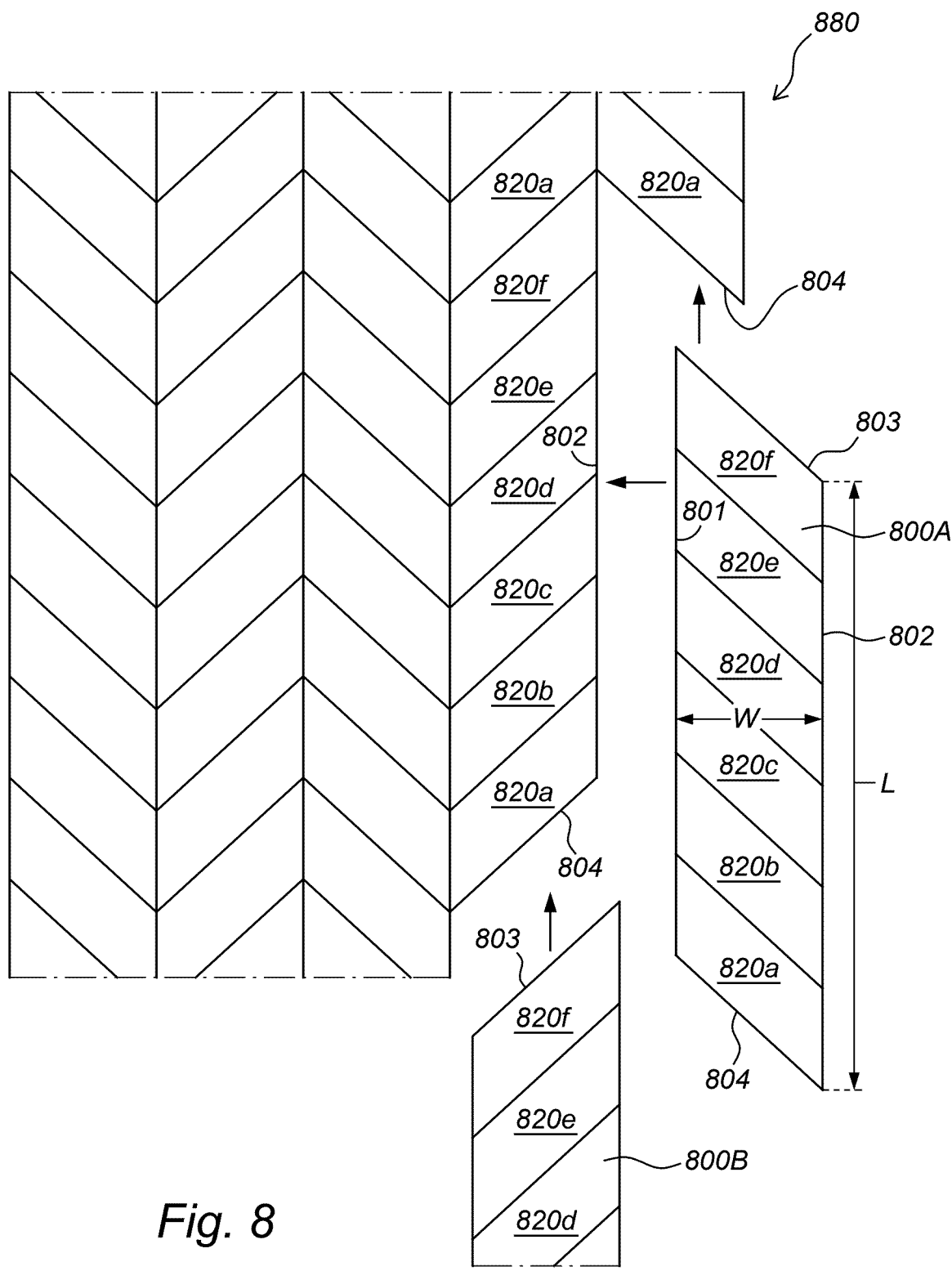
FIG. 8 a schematic representation of a third example of a multi-purpose tile system according to the invention.

FIG. 8 shows a schematic representation of a third example of a multi-purpose tile system 880 according to the invention comprising a plurality of multi-purpose tiles 800A, 800B. The figure shows a top view. The tiles 800A, 800B are equivalent to the tiles 600A, 600B shown in FIGS. 5a and 5b, and having equivalent coupling profiles of which examples are also shown in FIGS. 1-2d. The tiles 800A, 800B have the shape of a parallelogram, wherein opposing edges 801, 802, 803, 804 have a similar length and adjacent edges differ in length. Each tile 800A, 800B comprises a plurality of strip shaped upper substrates 820a-f affixed to an upper side of the base layer. The upper substrates 820a-f are parallel oriented.

The longitudinal direction of each upper substrate 820a-f of a tile 800A, 800B is substantially parallel to the short edges of the tile 800A, 800B. The longitudinal direction of a tile 800A, 800B therefore differs from the longitudinal direction of an upper substrate 820a-e affixed thereto. When the tiles 800A, 800B are in a joined configuration, as is for example shown in the left side of the figure, the plurality of upper substrates 820a-e of a tile form a continuation of the upper substrates 820a-e of an adjacent tile in longitudinal direction of the tile. This means that the upper substrates 820a-e of an A-type of tile 800A are substantially parallel to the upper substrates of an adjacent A-type of tile 800A. The same applies to B-type of tiles 800B. Due to this configuration of upper substrates 820a-e, it will be difficult or even impossible to observe that the upper substrates 820a-e are not individual tiles which are mutually connected during formation of the tile system. It is a benefit of the configuration that not all the upper substrates 820a-e which visualize the chevron pattern have to be mutually joined. Due to the tiles 800A, 800B comprising a substantially rigid base layer at least partially made of a composite material comprising at least one plastic material, the tiles 800A, 800B have sufficient rigidity to have relatively large dimensions. The first edge 801 and second edge 802 can for example be up to 2 meter in length (L). The width (W) of the tile can for example be 30-50 centimetre. Therefore the system according the invention can significantly reduce the required time for installation of the tile system 880 compared to a system comprising conventional tiles which are in the dimensions of an upper substrate 820a-e which conventional system visually seen looks similar.

Figure 9:
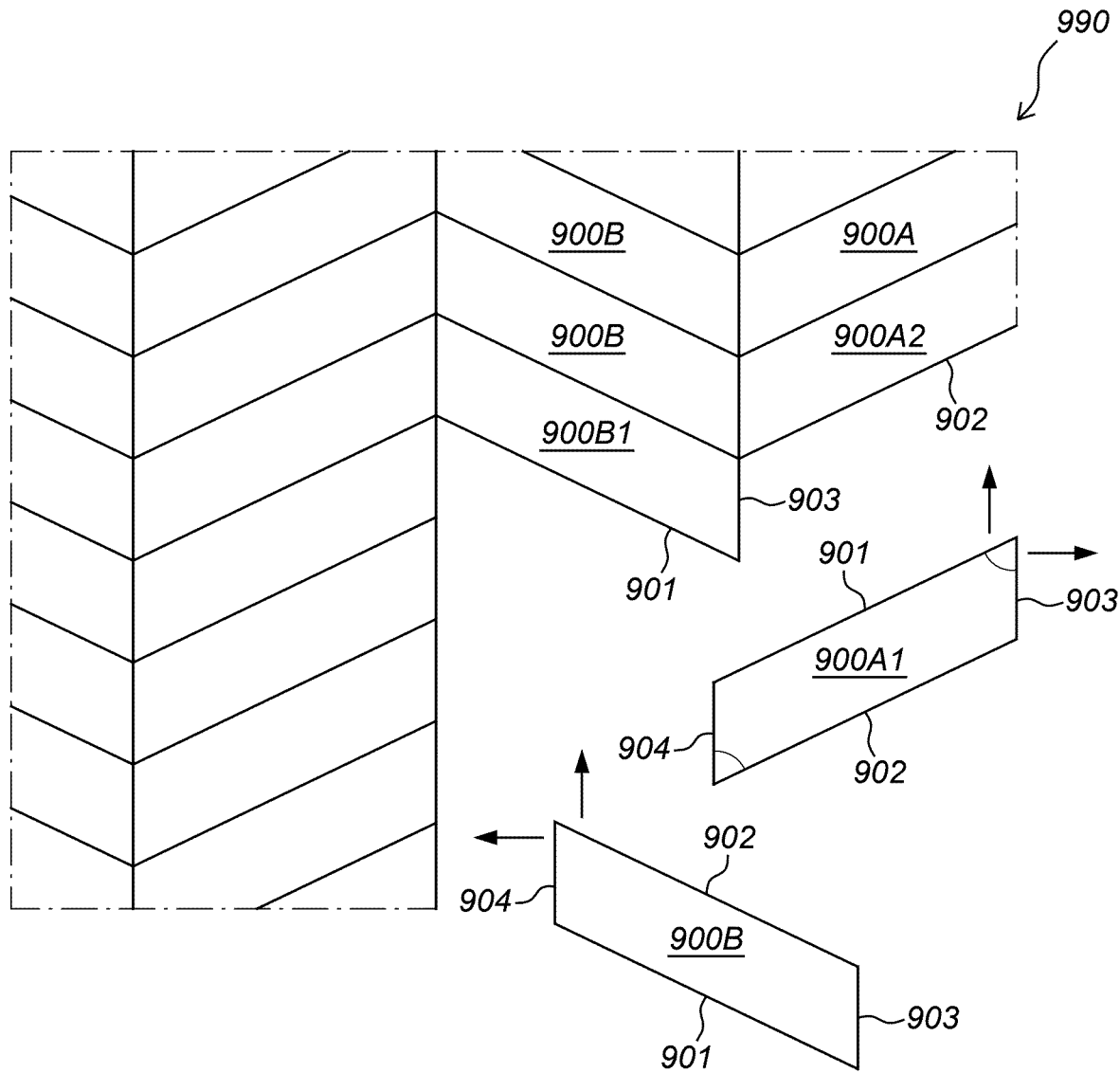
FIG. 9 a schematic representation of a fourth example of a multi-purpose tile system according to the invention.

FIG. 9 show a schematic representation of a fourth example of a multi-purpose tile system 990 according to the invention comprising a plurality of multi-purpose tiles 900A, 900B. The figure shows a top view. The tiles 900A, 900B are equivalent to the tiles 700A, 700b shown in FIG. 7, however the tiles 900A, 900B are joined in a different manner which results in different tile pattern of the tile system 990. The edges 901, 902, 903, 904 can be provided with coupling profiles as described in the previous figures. It is also possible that the tiles 900A, 900B have the shape of a rhombus or a rhomboid. Installation of the tile system 990 can for example be realized by interconnecting said tiles 900A, 900B via substantially vertically downward movement, or drop down movement of a first tile 900A1 towards an already installed second tile 900A2, where a downward tongue of the first mechanical coupling means of the first tile 900A1 will co-act with an upward tongue of the first mechanical coupling means of a second tile 900A2 such that mutual locking of said tiles 900A1, 900A2 is obtained. During this vertically downward movement of the first tile 900A1 towards the second tile 900A2, the downward tongue of the second mechanical coupling means of the first tile 900A1 can be connected (simultaneously) with an upward tongue of the second mechanical coupling means of an another already installed third tile 900B1.

Hence, the above-described inventive concepts are illustrated by several illustrative embodiments. It is conceivable that individual inventive concepts may be applied without, in so doing, also applying other details of the described example. It is not necessary to elaborate on examples of all conceivable combinations of the above-described inventive concepts, as a person skilled in the art will understand numerous inventive concepts can be (re)combined in order to arrive at a specific application.

It will be apparent that the invention is not limited to the working examples shown and described herein, but that numerous variants are possible within the scope of the attached claims that will be obvious to a person skilled in the art.

The verb "comprise" and conjugations thereof used in this patent publication are understood to mean not only "comprise", but are also understood to mean the phrases "contain", "substantially consist of", "formed by" and conjugations thereof.

The invention claimed is:

1. A multi-purpose tile system, comprising a plurality of multi-purpose tiles, wherein said tiles are configured to being joined in a chevron pattern, wherein each tile comprises:
- a first pair of opposing edges consisting of a first edge and an opposite second edge;
- a second pair of opposing edges consisting of a third edge and an opposing fourth edge, wherein:
- the first edge and the third edge enclose a first acute angle, and wherein the second edge and the fourth edge enclose a second acute angle opposing said first acute angle, and wherein the second edge and the third edge enclose a first obtuse angle, and wherein the first edge and the fourth edge enclose a second obtuse angle opposing said first obtuse angle, and
  wherein
- the first pair of opposing edges have pairs of opposing first mechanical coupling means for locking together said tiles at least vertically, and also horizontally, comprising:
  - a first coupling profile, comprising an upward tongue, and
  - a second coupling profile, comprising a downward tongue, and
- the second pair of opposing edges have pairs of opposing second mechanical coupling means for locking together said tiles at least vertically, and also horizontally, comprising:
  - a third coupling profile, comprising an upward tongue, and
  - a fourth coupling profile, comprising a downward tongue,
- wherein the first coupling profile of the tile to be coupled is adapted for co-action with the second and/or fourth coupling profile of another tile of said tiles for mutual locking of the first coupling profile and the second and/or fourth coupling profile,
- wherein the third coupling profile of the tile to be coupled is adapted for co-action with the second and/or fourth coupling profile of another tile of said tiles for mutual locking of the third coupling profile and the second and/or fourth coupling profile,
  - wherein the second and fourth coupling profile allow locking together said tiles during substantially vertically downward movement of the tile towards the first and/or third coupling profile of a further tile of said tiles, leading to locking of the coupled coupling profiles,
  - wherein the first coupling profile further comprises:
- at least one upward flank lying at a distance from the upward tongue and an upward groove formed between the upward tongue and the upward flank, wherein at least a part of a side of the upward tongue facing the upward flank is inclined upwardly towards the upward flank, and wherein at least a part of a side of the upward tongue facing away from the upward flank comprises at least one first locking element, which makes integral part of the upward tongue,
  - wherein the second coupling profile further comprises:
- at least one downward flank lying at a distance from the downward tongue, and a downward groove formed between the downward tongue and the downward flank, wherein at least a part of a side of the downward tongue facing the downward flank is inclined downwardly towards the downward flank, and wherein the downward flank comprises at least one second locking element, which makes integral part of the downward flank, and adapted for co-action with the at least one first locking element of yet a further tile of said tiles, wherein the third coupling profile further comprises:
- at least one upward flank lying at a distance from the upward tongue and an upward groove formed between the upward tongue and the upward flank, wherein at least a part of a side of the upward tongue facing the upward flank is inclined toward the upward flank, and wherein at least a part of a side of the upward tongue facing away from the upward flank comprises at least one third locking element, which makes integral part of the upward tongue,
  and wherein the fourth coupling profile further comprises:
- at least one downward flank lying at a distance from the downward tongue, and a downward groove formed between the downward tongue and the downward flank, wherein at least a part of a side of the downward tongue facing the downward flank is inclined toward the downward flank, and wherein the downward flank comprises at least one fourth locking element, which makes integral part of the downward flank, and adapted for co-action with the at least one third locking element of yet a further tile of said tiles;
  - wherein the tile comprises a substantially rigid base layer at least partially made of a composite material comprising at least one plastic material;
  - wherein the second coupling profile comprises an upper bridge connecting the downward tongue to the base layer, wherein the upper bridge is configured to deform during coupling of adjacent tiles of said tiles, to widen the downward groove, and wherein a lower side of the upper bridge of the second coupling profile is at least partially inclined,
  - wherein the fourth coupling profile comprises an upper bridge connecting the downward tongue to the base layer, wherein the upper bridge is configured to deform during coupling of adjacent tiles of said tiles, to widen the downward groove, and wherein a lower side of the upper bridge of the fourth coupling profile is at least partially inclined.

2. The tile system according to claim 1, wherein the system comprises two different types of said tiles (A and B respectively), and wherein the first mechanical coupling means of one type of tile of said tiles along the first pair of opposite edges are arranged in a mirror-inverted manner relative to the corresponding first mechanical coupling means along the same first pair of opposite edge portions of the other type of tile of said tiles.

3. The tile system according to claim 1, wherein the tile has a configuration wherein:
- the first coupling profile is arranged at the first edge;
- the second coupling profile is arranged at the second edge;
- the third coupling profile is arranged at the third edge; and
- the fourth coupling profile is arranged at the fourth edge.

4. The tile system according to claim 1, wherein the tile has a configuration wherein:
- the first coupling profile is arranged at the second edge;
- the second coupling profile is arranged at the first edge;
- the third coupling profile is arranged at the third edge; and
- the fourth coupling profile is arranged at the fourth edge.

5. The tile system according to claim 1, wherein the first, second, third, and fourth coupling profiles are designed such that locking of the second coupling profile of the tile with a first coupling profile of another tile can take place substantially simultaneously with the locking of the fourth coupling profile of the tile with the third coupling profile of yet another tile of said tiles.

6. The tile system according to claim 1, wherein the length of the first edge and the length of the second edge of the tile are substantially identical.

7. The tile system according to claim 1, wherein the length of the first edge, the length of the second edge, the length of the third edge, and the length of the fourth edge are substantially identical.

8. The tile system according to claim 1, wherein the length of the first edge and the length of the second edge of the tile are greater than the length of the third edge and the fourth edge of said tile.

9. The tile system according to claim 1, wherein the first acute angle and the second acute angle are situated between 30 and 60 degrees.

10. The tile system according to claim 1, wherein the first obtuse angle and the second obtuse angle are situated between 120 and 150 degrees.

11. The tile system according to claim 1, wherein the substantially rigid base layer of the tile comprises between 0 and 10% of plasticizer.

12. The tile system according to claim 1, wherein the tile comprises at least one upper substrate affixed to an upper side of the base layer, wherein said upper substrate comprises a decorative layer.

13. The tile system according to claim 12, wherein the at least one upper substrate comprises:
a decorative layer and
an abrasion resistant wear layer covering said decorative layer, wherein a top surface of said wear layer is the top surface of said tile, and wherein the wear layer is a transparent material, such that decorative layer is visible through the transparent wear layer,
and a transparent finishing layer situated in between the decorative layer and the wear layer.

14. The tile system according to claim 12, wherein the upper substrate is at least partially made of at least one material selected from the group consisting of: metals, alloys, macromolecular materials such as vinyl monomer copolymers and/or homopolymers; condensation polymers such as polyesters, polyamides, polyimides, epoxy resins, phenol-formaldehyde resins, urea formaldehyde resins; natural macromolecular materials or modified derivatives thereof such as plant fibres, animal fibres, mineral fibres, ceramic fibres and carbon fibres.

15. The tile system according to claim 14, wherein the vinyl monomer copolymers and/or homo-polymers are selected from the group consisting of polyethylene, polyvinyl chloride, polystyrene, polymethacrylates, polyacrylates, polyacrylamides, ABS, (acrylonitrile-butadiene-styrene) copolymers, polypropylene, ethylene-propylene copolymers, polyvinylidene chloride, polytetrafluoroethylene, polyvinylidene fluoride, hexafluoropropene, and styrene-maleic anhydride copolymers.

16. The tile system according to claim 12, wherein the at least one upper substrate is affixed to the upper side of the base layer by means of an adhesive.

17. The tile system according to claim 12, wherein the tile comprises a plurality of strip shaped upper substrates affixed to an upper side the base layer, wherein said upper substrate are arranged side by side in the same plane, preferably in a parallel configuration.

18. The tile system according to claim 17, wherein the plurality of upper substrates substantially completely cover the upper surface of the base layer.

19. The tile system according to claim 17, wherein each of the plurality of upper substrates extends from the first edge to the second edge of the tile.

20. The tile system according to claim 17, wherein each of the plurality of upper substrates comprises a decorative layer, wherein the decorative layers of at least two adjacently arranged upper substrates have different appearances.

21. The tile system according to claim 1, wherein the tile comprises at least one backing layer affixed to a bottom side of the base layer, wherein said at least one backing layer at least partially made of a flexible material, preferably an elastomer.

22. The tile system according to claim 21, wherein the thickness of the backing layer is at least 0.5 mm.

23. The tile system according to claim 1, wherein each tile comprises at least one reinforcing layer, wherein the density of the reinforcing layer is situated between 1000 and 2000 kg/m3.

24. The tile system according to claim 1, wherein at least a part of the first coupling profile and/or at least a part of the second coupling profile of the tile is integrally connected to the base layer, and/or wherein at least a part of the third coupling profile and/or at least a part of the fourth coupling profile of each tile is integrally connected to the base layer.

25. The tile system according to claim 1, wherein the first coupling profile and/or the second coupling profile allows deformation during coupling and uncoupling, and/or wherein the third coupling profile and/or the fourth coupling profile allows deformation during coupling and uncoupling.

26. The tile system according to claim 1, wherein the first coupling profile comprises a bridge connecting the upward tongue of said first coupling profile to the base layer, wherein the minimum thickness of the bridge of the first coupling profile is smaller than the minimum width of the upward tongue, and/or wherein the third coupling profile comprises a bridge connecting the upward tongue of said third coupling profile to the base layer, wherein the minimum thickness of the bridge of the third coupling profile is smaller than the minimum width of the upward tongue.

27. The tile system according to claim 1, wherein the upper side of the upward tongue of the first or third coupling profile is at least partially inclined, wherein the inclination of the upper side of the upward tongue of said first or third coupling profile and the inclination of the upper bridge part of the second coupling profile are substantially similar, wherein both inclinations for instance mutually enclose an angle between 0 and 5 degrees.

28. The tile system according to claim 1, wherein the first locking element comprises at least one outward bulge, and that the second locking element comprises at least one recess, which the outward bulge is adapted to be at least partially received in a recess of an adjacent coupled tile for the purpose of realizing a locked coupling.

29. The tile system according to claim 1, wherein a side of the downward tongue of the second coupling profile facing away from the downward flank is provided with a first secondary locking element, and wherein the upward flank is provided with a second secondary locking element, said first secondary locking element being adapted to cooperate with a second secondary locking element of another tile of said tiles.

30. The tile system according to claim 29, wherein the co-action between the third locking element and the first secondary locking element, in coupled condition of two tiles of said tiles, defines a tangent T1 which encloses an angle A1 with a plane defined by the tile, which angle A1 is smaller than an angle A2 enclosed by said plane defined by the tile and a tangent T2 defined by a co-action between an inclined part of a side of the upward tongue facing toward the upward flank and an inclined part of a side of the downward tongue facing toward the downward flank.

31. The tile system according to claim 30, wherein the greatest difference between angle A1 and angle A2 is situated between 5 and 10 degrees.

32. The tile system according to claim 29, wherein the shortest distance between an upper edge of the downward tongue and a lower side of the base layer defines a plane, wherein the first secondary locking element and at least a part of the downward tongue are situated at opposite sides of said plane.

33. The tile system according to claim 29, wherein the minimum distance between said first secondary locking element and an upper side of the tile is smaller than the minimum distance between an upper side of the upward tongue and said upper side of the tile.

34. The tile system according to claim 1, wherein the base layer of the tile is at least partially made of polyvinyl chloride (pvc).

35. The tile system according to claim 1, wherein the base layer of the tile comprises a stone plastic composite (SPC).

36. The tile system according to claim 1, wherein the base layer of the tile comprises a wood plastic composite (WPC).

37. The tile system according to claim 1, wherein at least a number of tiles of said tiles is identical.

38. The tile system according to claim 1, wherein the first coupling profile and the third coupling profile of the tile are substantially identical, and wherein the second coupling profile and the fourth coupling profile of said tile are substantially identical.

39. The tile system according to claim 1, wherein the tile system comprises different types of tiles (A and B respectively) of said tiles, wherein the size of a first type of tile (A) of said tiles differs from the size of second type of tile (B) of said tiles.

40. The tile system according to claim 1, wherein distinctive visual markings are applied to different tile types of said tiles, preferably for installation purposes.

41. The tile system according to claim 40, wherein the distinctive visual markings are applied to the upward tongue of at least one first coupling profile of the tile type.

42. A tile covering ceiling covering, or wall covering, consisting of mutually coupled tiles of said tiles according to claim 1.

43. A tile for use in multi-purpose tile system according to claim 1.

* * * * *